United States Patent
Shibata et al.

(10) Patent No.: US 9,344,695 B2
(45) Date of Patent: May 17, 2016

(54) AUTOMATIC PROJECTION IMAGE CORRECTION SYSTEM, AUTOMATIC PROJECTION IMAGE CORRECTION METHOD, AND NON-TRANSITORY STORAGE MEDIUM

(75) Inventors: Takashi Shibata, Tokyo (JP); Akihiko Iketani, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 61 days.

(21) Appl. No.: 14/344,806

(22) PCT Filed: Sep. 11, 2012

(86) PCT No.: PCT/JP2012/005748
§ 371 (c)(1),
(2), (4) Date: Mar. 13, 2014

(87) PCT Pub. No.: WO2013/038656
PCT Pub. Date: Mar. 21, 2013

(65) Prior Publication Data
US 2014/0340529 A1 Nov. 20, 2014

(30) Foreign Application Priority Data
Sep. 15, 2011 (JP) .................................. 2011-201789

(51) Int. Cl.
*G03B 21/14* (2006.01)
*H04N 9/31* (2006.01)
(Continued)

(52) U.S. Cl.
CPC .............. *H04N 9/3185* (2013.01); *G03B 21/14* (2013.01); *G06T 5/006* (2013.01);
(Continued)

(58) Field of Classification Search
CPC ... G03B 21/14; H04N 9/3185; H04N 9/3197; H04N 9/3194; H04N 5/74; H04N 5/23296; H04N 5/2628; G06T 5/006
See application file for complete search history.

(56) References Cited

U.S. PATENT DOCUMENTS

| 2005/0280780 A1* | 12/2005 | Matsumoto et al. ............ 353/70 |
| 2010/0053569 A1* | 3/2010 | Furui .................... H04N 9/3194 353/70 |
| 2010/0123878 A1* | 5/2010 | Furui .............................. 353/70 |

FOREIGN PATENT DOCUMENTS

| JP | 07-220081 | 8/1995 |
| JP | 2001-320652 | 11/2001 |

(Continued)

OTHER PUBLICATIONS

International Search Report corresponding to PCT/JP2012/005748, dated Dec. 11, 2012; 1 pp.

*Primary Examiner* — Sultan Chowdhury
*Assistant Examiner* — Magda Cruz
(74) *Attorney, Agent, or Firm* — Wilmer Cutler Pickering Hale and Dorr LLP

(57) ABSTRACT

An automatic projection image correction system (1) includes: a projection image frame detection unit (101) that detects straight lines forming a frame of a screen-projected image which is projected onto a screen by a projector from a captured image obtained by capturing the screen-projected image using a camera; and a projector plane parameter estimation unit (102) that sets coordinate axes to a projector image, which is an original image of the screen-projected image, and the captured image and estimates at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

10 Claims, 22 Drawing Sheets

(51) Int. Cl.
  *H04N 5/74* (2006.01)
  *H04N 5/232* (2006.01)
  *H04N 5/262* (2006.01)
  *G06T 5/00* (2006.01)
  *G09G 3/00* (2006.01)

(52) U.S. Cl.
  CPC ........ *H04N 5/23296* (2013.01); *H04N 5/2628* (2013.01); *H04N 5/74* (2013.01); *H04N 9/3194* (2013.01); *H04N 9/3197* (2013.01); *G09G 3/002* (2013.01); *G09G 2320/0693* (2013.01); *G09G 2380/00* (2013.01)

(56) References Cited

FOREIGN PATENT DOCUMENTS

| | | |
|---|---|---|
| JP | 2008-109337 | 5/2008 |
| JP | 2010-128102 | 6/2010 |

* cited by examiner

AUTOMATIC PROJECTION IMAGE CORRECTION SYSTEM, AUTOMATIC PROJECTION IMAGE CORRECTION METHOD, AND NON-TRANSITORY STORAGE MEDIUM

CROSS-REFERENCE TO RELATED APPLICATIONS

This application is a national stage application of International Application No. PCT/JP2012/005748 entitled "Projection Image Automatic Correction System, Projection Image Automatic Correction Method and Program," filed on Sep. 11, 2012, which claims the benefit of the priority of Japanese Patent Application No. 2011-201789, filed on Sep. 15, 2011, the disclosures of each of which are hereby incorporated by reference in their entirety

TECHNICAL FIELD

The present invention relates to an automatic projection image correction system, an automatic projection image correction method, and a program.

BACKGROUND ART

A projection display device, such as a projector, projects an image (hereinafter, referred to as a projector image) which is output from, for example, a PC to the projector onto a screen. In this case, when the projector is arranged so as to be inclined with respect to the screen and the optical axis of a lens provided in the projector (hereinafter, referred to as the optical axis of the projector) is not parallel to a normal vector of the plane of the screen, a projection image which is projected onto the screen (hereinafter, referred to as a screen-projected image) is distorted in a trapezoidal shape as viewed from a direction directly facing the screen. In order to comfortably view the screen-projected image, it is necessary to correct the distortion of the screen-projected image.

RELATED DOCUMENT

Patent Document

[Patent Document 1] Japanese Laid-open Patent Publication No. 2010-128102

DISCLOSURE OF THE INVENTION

As one of methods for correcting distortion, there is a method which calculates the positional relationship between a screen and a projector (specifically, the inclination of the plane of the screen with respect to the optical axis of the projector and the distance between the projector and the screen) from a projector image and an image (hereinafter, referred to as a captured image) obtained by capturing a screen-projected image using a camera and corrects the distortion of the screen-projected image.

The principle of this method will be described in detail with reference to the drawings. First, the relationship among the projector image, the captured image, and the screen-projected image will be described with reference to FIG. 9.

In FIG. 9, an image obtained by projecting a projector image 900 onto a screen 906 using a projector 905 is a screen-projected image 903. In addition, an image obtained by capturing the image projected onto the screen 906 using a camera 907 is a captured image 901. In the captured image 901 and the screen-projected image 903, images are distorted as represented by 902 and 904. The distorted shape of the captured image 901 and a projected image of the screen-projected image 903 (that is, image conversion from the projector image 900 to the captured image 901 or image conversion from the projector image 900 to the screen-projected image 903) is uniquely determined by the geometric arrangement of the camera, the screen, and the projector.

In general, in the case of a projector having a camera provided therein, the geometric arrangement of the camera and the projector is fixed and predetermined. Therefore, when the geometric arrangement of the projector and the screen can be obtained from the captured image and the projector image, image conversion from the projector image to the screen-projected image is determined and it is possible to calculate a projector image corresponding to a distortion-corrected screen-projected image. The above is the principle of the method for correcting the distortion of the screen-projected image using the camera.

For example, Patent Document 1 discloses a method for correcting the distortion of a projection image on the basis of the above-mentioned principle. In the method disclosed in Patent Document 1, first, a plurality of screen-projected images (2204 and 2205) obtained by superimposing calibration patterns (2202 and 2203) with a predetermined shape on a projector image 2201 are captured. The difference between the plurality of captured images (2206 and 2207) is calculated and a measurement image 2208 for calculating the positional relationship between the screen and the projector is generated. The three-dimensional coordinates of the screen are measured from the measurement image on the basis of the principle of triangulation. Finally, the positional relationship between the screen and the projector is calculated from the measurement result and the distortion of the screen-projected image is corrected. FIG. 22 is quoted from Patent Document 1.

However, the method disclosed in Patent Document 1 has two problems.

The first problem is that ease of understanding of an image in the screen-projected image, that is, the visibility of the screen-projected image is reduced.

The reason is as follows. Since the image in which the calibration pattern is superimposed on the projector image which is intended to be projected by the user is projected onto the screen, a portion of content in the screen-projected image is hidden.

The second problem is that the use of the method is limited to a still image.

The reason is as follows. It is necessary to capture a screen-projected image obtained by superimposing two different calibration patterns on the same projector image using a camera in order to generate the measurement image required to calculate the positional relationship between the screen and the camera. Therefore, it is assumed that the projector image is not changed during the correction process.

An object of the invention is to provide an automatic projection image correction system that does not superimpose a calibration pattern which reduces visibility on a screen-projected image and can correct distortion of the screen-projected image even for images other than a still image.

According to the invention, there is provided an automatic projection image correction system including: a projection image frame detection unit that detects straight lines forming a frame of a screen-projected image which is projected onto a screen by a projector from a captured image obtained by capturing the screen-projected image using a camera; and a projector plane parameter estimation unit that sets coordinate axes to a projector image, which is an original image of the screen-projected image, and the captured image and estimates at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

According to the invention, there is provided a program that causes a computer to function as: a projection image frame detection unit that detects straight lines forming a frame of a screen-projected image which is projected onto a screen by a projector from a captured image obtained by capturing the screen-projected image using a camera; and a projector plane parameter estimation unit that sets coordinate axes to a projector image, which is an original image of the screen-projected image, and the captured image and estimates at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

According to the invention, there is provided an automatic projection image correction method that causes a computer to perform: a projection image frame detection step of detecting straight lines forming a frame of a screen-projected image which is projected onto a screen by a projector from a captured image obtained by capturing the screen-projected image using a camera; and a projector plane parameter estimation step of setting coordinate axes to a projector image, which is an original image of the screen-projected image, and the captured image and estimating at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

According to the invention, it is possible to achieve an automatic projection image correction system that does not superimpose a calibration pattern which reduces visibility on a screen-projected image and can correct distortion of the screen-projected image even for images other than a still image.

BRIEF DESCRIPTION OF THE DRAWINGS

The above-mentioned object, other objects, features, and advantages of the invention will become apparent from the following description of preferred embodiments and the following accompanying drawings.

DESCRIPTION OF EMBODIMENTS

Hereinafter, embodiments of the invention will be described with reference to the drawings.

An apparatus according to this embodiment is implemented by an arbitrary combination of hardware and software including a CPU, a memory, a program loaded to the memory (including a program which is stored in the memory in advance before the shipment of the apparatus and a program which is downloaded from a storage medium, such as a CD, or a server on the Internet), a storage unit, such as a hard disk storing the program, and an interface for network connection in an arbitrary computer. It will be understood by those skilled in the art that the apparatus and a method for implementing the apparatus can be modified in various ways.

Functional block diagrams which are used in the description of this embodiment do not show the structure of hardware units, but show functional unit blocks. In these block diagrams, each device is shown so as to be implemented by one apparatus. However, implementation means is not limited thereto. That is, structures may be physically or logically divided.

<First Embodiment>

Figure 1:
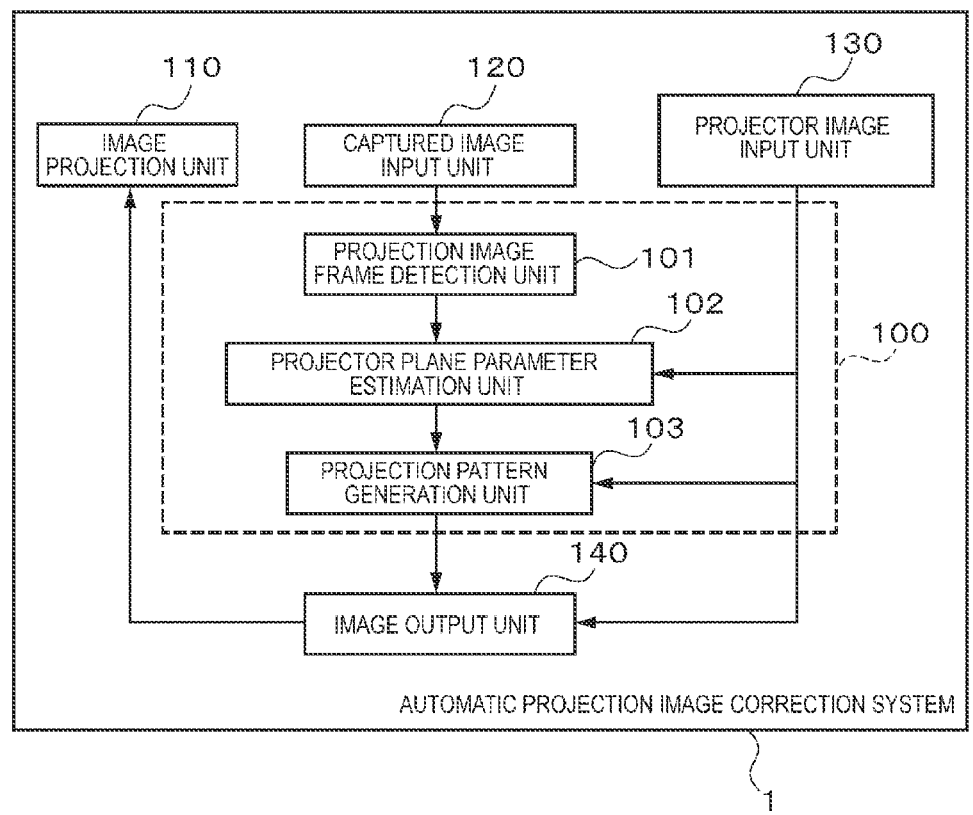
FIG. 1 is an example of a functional block diagram illustrating an automatic projection image correction system according to a first embodiment.

Referring to FIG. 1, an automatic projection image correction system 1 according to a first embodiment of the invention includes a computer (a central processing unit; a processor; or a data processing device) 100 which is operated by program control, an image projection unit 110, a captured image input unit 120, a projector image input unit 130, and an image output unit 140. The computer (a central processing unit; a processor; or a data processing device) 100 includes a projection image frame detection unit 101, a projector plane parameter estimation unit 102, and a projection pattern generation unit 103. The outline of the operation of these units is as follows.

The image projection unit 110 projects the image output from the image output unit 140, which will be described below, onto a screen. As a method of projecting the output image onto the screen, for example, a projection display device, such as a projector, is used.

An image (hereinafter, referred to as a captured image) obtained by capturing a screen-projected image which is projected onto the screen by the image projection unit 110 using, for example, a camera is input to the captured image input unit 120. Then, the captured image input unit 120 stores the input captured image in a memory (not shown). Although not shown in the drawings, the automatic projection image correction system 1 may include a camera for capturing the screen-projected image and the relative positional relationship between the camera and the projector included in the image projection unit 110 may be fixed. That is, the inclination of the optical axes of the camera and the projector and the distance between the optical centers of the camera and the projector may be fixed and the automatic projection image correction system may hold these values in advance.

An image (projector image) which is intended to be projected onto the screen by the user is input to the projector image input unit 130. For example, the automatic projection image correction system 1 is configured so as to perform wired and/or wireless communication with another apparatus. The projector image is input from another apparatus, such as a PC or a portable terminal, to the projector image input unit 130. Then, the projector image input unit 130 stores the input projector image in the memory (not shown).

The image output unit 140 outputs, to the image projection unit 110, the projector image input to the projector image input unit 130 or a "projector image corrected such that the screen-projected image is not distorted" which is generated by the projection pattern generation unit 103, which will be described below.

The projection image frame detection unit 101 detects straight lines forming the frame of the screen-projected image from the captured image which is input to the captured image input unit 120. For example, the projection image frame detection unit 101 may detect a plurality of straight lines from the screen-projected image included in the captured image and may detect straight lines forming the frame of the screen-projected image from the detected straight line group on the basis of at lest one of the reliability of the straight lines, the inclination of the straight lines, and the position of the straight lines. Hereinafter, the straight lines which are detected as the straight lines forming the frame of the screen-projected image are referred to as "detected straight lines".

Figure 10:
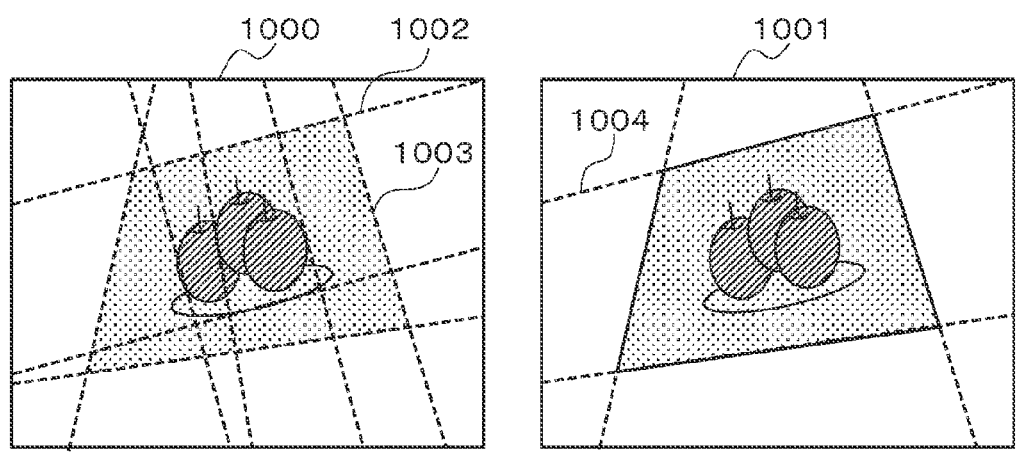
FIG. 10 is a conceptual diagram illustrating the structure of the invention.

For example, as shown in FIG. 10, first, the projection image frame detection unit 101 detects a straight line group in the captured image (a state 1000 in FIG. 10). Then, the projection image frame detection unit 101 selects four straight lines forming the frame of the screen-projected image in the captured image on the basis of the reliability of the detected straight lines, and the inclination and position of the straight lines (a state 1001 in FIG. 10) and stores the position of each of the four straight lines as the position of the detected straight lines in the memory (not shown). Next, an example of the details of each process will be described.

For example, a straight line detection method using Hough transform can be used as the method of detecting the straight lines in the captured image, which is a first process. The straight line detection method using Hough transform determines pixels of an edge segment in the image, votes for the number of pixels in the edge segment on each straight line which is represented by all inclinations θ and a distance ρ from the origin when two-dimensional coordinates are defined on the captured image, and detects, as a straight line, only the straight line in which the number of votes is equal to or greater than a predetermined value. Hereinafter, straight lines in the straight line group detected by Hough transform are distinguished by a suffix and the number of votes, inclination, and distance of each straight line are represented by $V_1$, $\theta_1$, and $\rho_1$, respectively.

Figure 11:
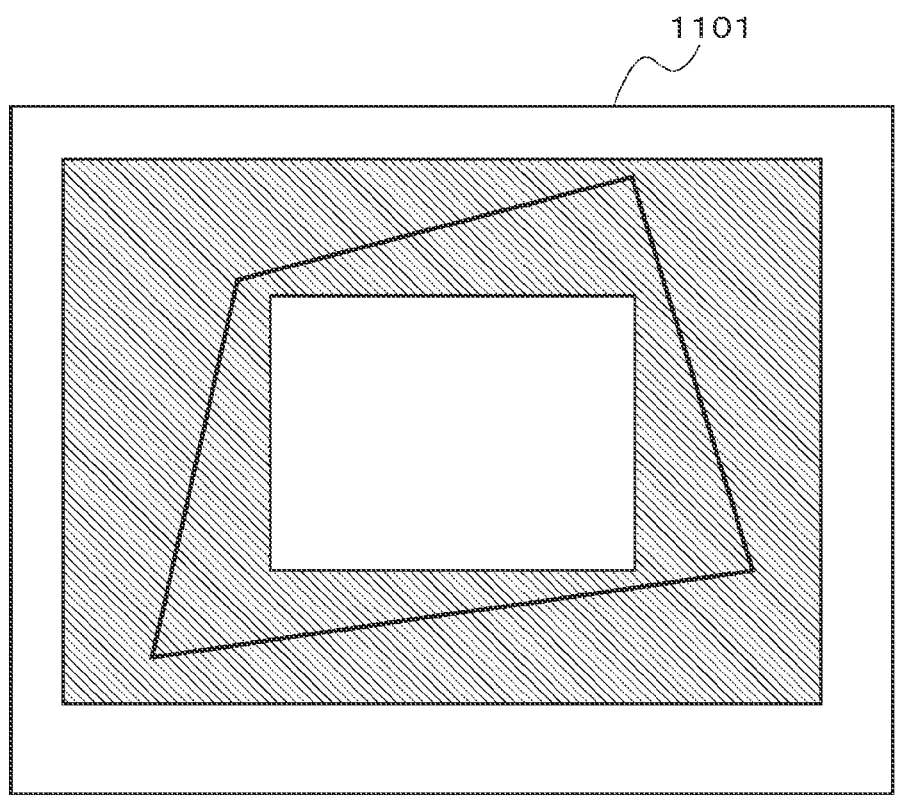
FIG. 11 is a conceptual diagram illustrating the structure of the invention.

For example, referring to 1000 in FIG. 10, a dotted line 1002 or a dotted line 1003 is a straight line detected by Hough transform. In this embodiment, as described above, the straight lines represented by all inclinations θ and the distance ρ are detection targets. However, a vote may be cast for only the straight lines in a predetermined region (a hatched portion 1101 in FIG. 11) of the captured image shown in FIG. 11 to detect the straight lines. At the same time, a vote may be cast for only the number of pixels of the edge segment in the predetermined region. As such, since only the straight lines in the predetermined region are detected, it is possible to prevent a straight line which does not form the frame of the screen-projected image from being detected.

Then, four straight lines forming the frame of the screen-projected image are selected from the obtained straight line group. Next, a case in which an upper straight line 1004 of the frame shown in FIG. 10 is selected will be described. The projection image frame detection unit 101 calculates reliability $L_i(V_i, \theta_i, \rho_i)$ having the number of votes $V_i$, the inclination $\theta_i$, and the distance $\rho_i$ as arguments for all of the detected straight lines and a straight line with the maximum reliability as the upper straight line of the frame. The reliability $L_i$ is a function which is characterized in that a straight line having the inclination $\theta_i$ and the distance $\rho_i$ closest to the inclination $\theta_0$ and distance $\rho_0$ of a predetermined straight line and the largest number of votes $V_i$ has a larger value. For example, as the reliability $L_i(V_i, \theta_i, \rho_i)$, the following may be used.

$$L_i(V_i, \theta_i, \rho_i) = \frac{V_i}{(|\theta_i - \theta_0| + 1)(|\rho_i - \rho_0| + 1)} \quad \text{[Equation 1]}$$

The same process as described above is performed for a lower portion, a right portion, and a left portion of the frame to detect four straight lines. Finally, the projection image frame detection unit 101 stores the position of the frame formed by the detected four straight lines in the memory (not shown). When three or more straight lines are not detected from the captured image, the projection image frame detection unit 101 stores a frame detection failure flag in the memory (not shown).

Returning to FIG. 1, the projector plane parameter estimation unit 102 estimates the relationship between the projector and the screen, specifically, the distance between the screen and the projector and/or the inclination of the screen with respect to the optical axis of the projector. The projector plane parameter estimation unit 102 can further estimate the zoom ratio of the projector.

For example, first, the projector plane parameter estimation unit 102 sets coordinate axes to the projector image, which is the original image of the screen-projected image, and the captured image and acquires coordinate data for the detected straight lines at the coordinates of the captured image and coordinate data for the straight lines corresponding to the frame of the projector image at the coordinates of the projector image. Then, the projector plane parameter estimation unit 102 can estimate the distance between the screen and the projector, the inclination of the screen with respect to the optical axis of the projector, and the zoom ratio of the projector, using the coordinate data, the intrinsic parameters of the camera indicating a predetermined focal length of the camera or the aspect ratio of the pixel in the CCD, the angle formed between the optical axes of the projector and the camera, and the distance between the optical centers of the projector and the camera.

Specifically, the projector plane parameter estimation unit 102 has a conversion rule for converting a point on the coordinates of the captured image into a point on the coordinates of the projector image, using the inclination of the optical axes of the projector and the camera, the distance between the optical centers of the projector and the camera, the intrinsic parameters of the camera, the distance between the screen and the projector, the inclination of the screen with respect to the optical axis of the projector, and the zoom ratio of the projector. Then, the projector plane parameter estimation unit 102 converts the coordinate data of the detected straight lines at the coordinates of the captured image into coordinate data at the coordinates of the projector image, using the inclination of the optical axes of the projector and the camera, the distance between the optical centers of the projector and the camera, the intrinsic parameters of the camera, which are fixed values, and the distance between the screen and the projector, the inclination of the screen with respect to the optical axis of the projector, and the zoom ratio of the projector, which are indefinite values, and estimates a plurality of indefinite values such that the converted coordinate data is close to the coordinate data of the straight lines corresponding to the frame of the projector image at the coordinates of the projector image.

Alternatively, the projector plane parameter estimation unit 102 may have the conversion rule, convert the coordinate data of the straight lines corresponding to the frame of the projector image at the coordinates of the projector image into coordinate data at the coordinates of the captured image, using the inclination of the optical axes of the projector and the camera, the distance between the optical centers of the projector and the camera, the value of each of the intrinsic parameters of the camera, which are fixed values, and the distance between the screen and the projector, the inclination of the screen with respect to the optical axis of the projector, and the zoom ratio of the projector, which are indefinite values, and estimate a plurality of indefinite values such that the converted coordinate data is close to the coordinate data of the detected straight lines at the coordinates of the captured image.

Figure 12:
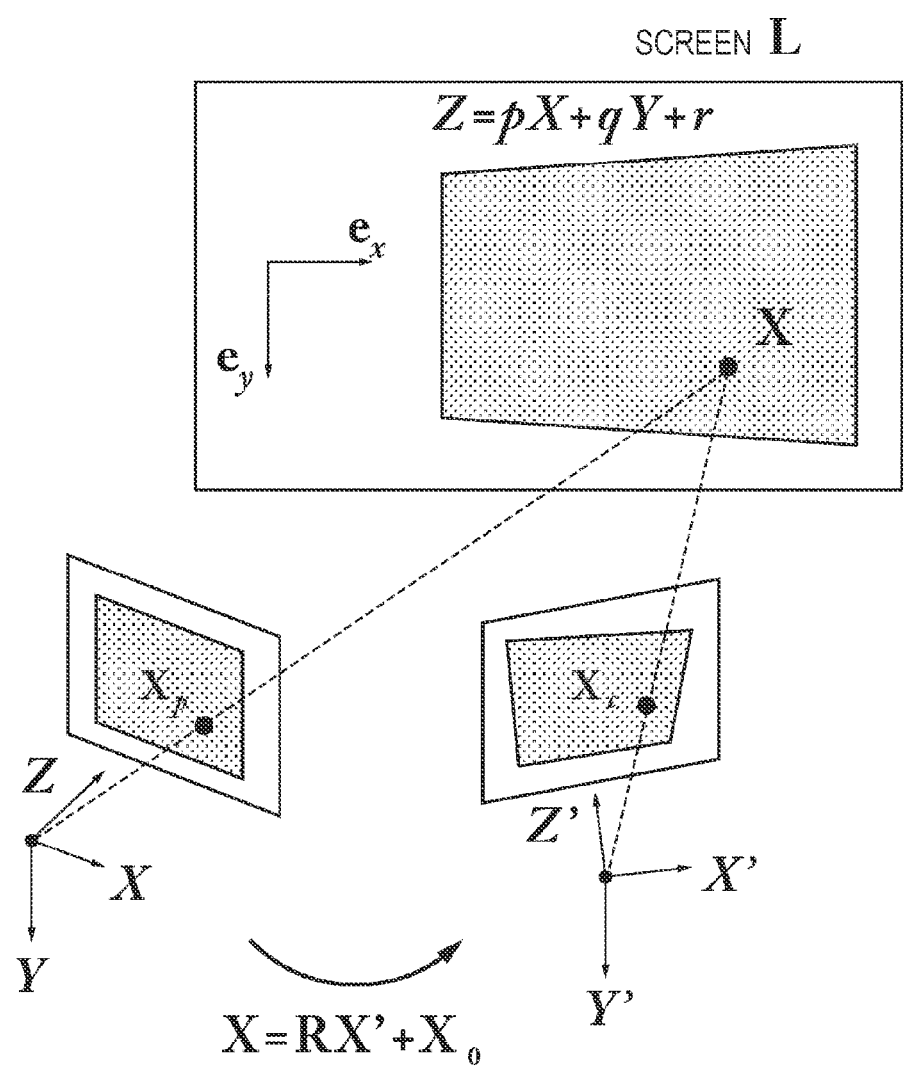
FIG. 12 is a conceptual diagram illustrating the structure of the invention.

These processes will be described in detail below. First, the projector plane parameter estimation unit 102 defines three coordinate systems, that is, a projector coordinate system, a camera coordinate system, and a screen coordinate system. As shown in FIG. 12, a coordinate system in which the optical center of the projector is the origin and the optical axis is aligned with the Z-axis is defined as the projector coordinate system and each coordinate is represented by $X=(X, Y, Z)^T$. Similarly, a coordinate system in which the optical center of the camera is the origin and the optical axis is aligned with the Z-axis is defined as the camera coordinate system and each coordinate is represented by $X'=(X', Y', Z')^T$. In this case, a change in coordinates between the projector coordinate system and the camera coordinate system is represented as follows.

$$X=RX'+X_0 \quad \text{[Equation 2]}$$

Here, R is a rotation matrix and is defined using Euler's expression using a rotation angle with respect to the X-axis, the Y-axis, and the Z-axis between the projector and the camera. $X_0$ is a translation vector. R and $X_0$ can be calculated from the angle formed between the optical axes of the projector and the camera and the distance between the optical centers of the projector and the camera. Two unit vectors $e_x$ and $e_y$, which are perpendicular to each other on the plane of a screen L are defined as vectors which are perpendicular to a normal vector of the plane of the screen. A coordinate system in which the x-axis and the y-axis are parallel to $e_x$ and $e_y$, respectively, is defined as the screen coordinate system. It is noted that the screen-projected image is on the screen coordinate system.

Figure 13:
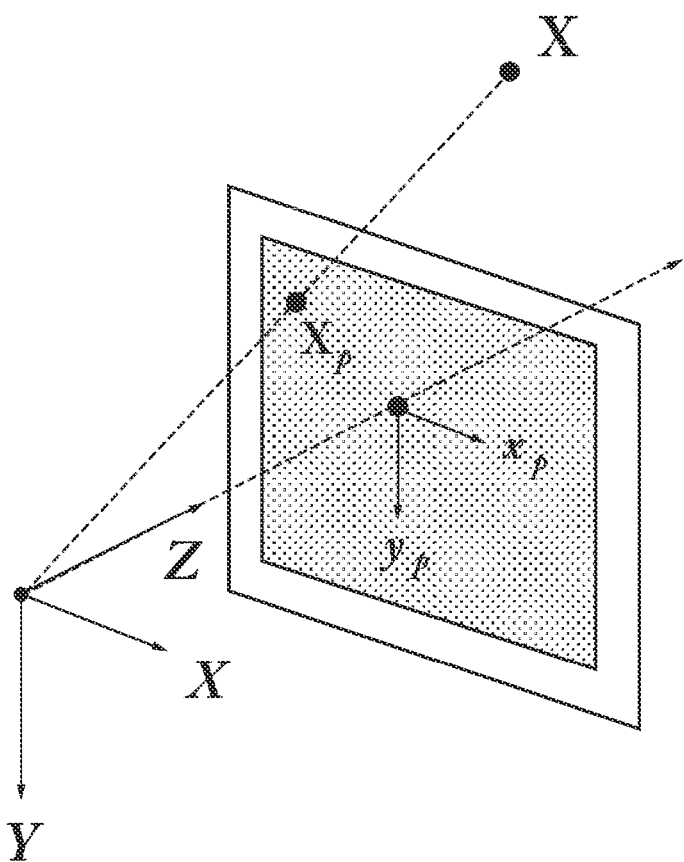
FIG. 13 is a conceptual diagram illustrating the structure of the invention.

As shown in FIG. 13, the relationship between the projector coordinates $X=(X, Y, Z)^T$ and the homogeneous coordinates $x_p=(x_p, y_p, 1)^T$ of the projector coordinates is defined as follows.

$$x_p = \begin{pmatrix} x_p \\ y_p \\ 1 \end{pmatrix} = \begin{pmatrix} X/Z \\ Y/Z \\ 1 \end{pmatrix} \quad \text{[Equation 3]}$$

Figure 14:
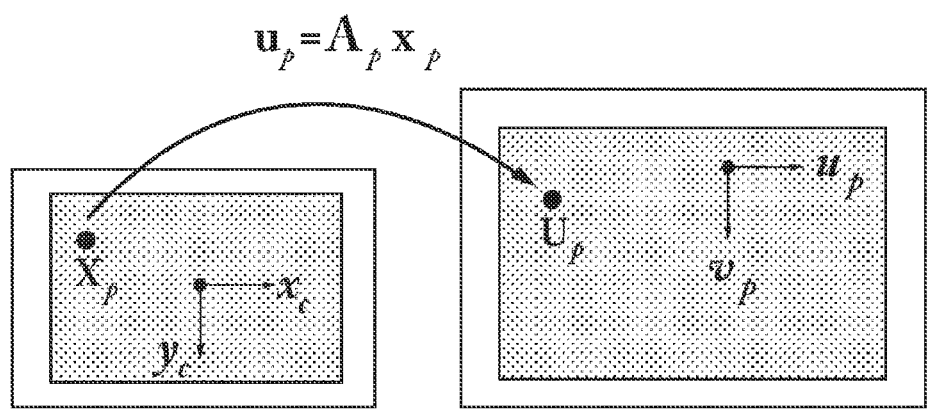
FIG. 14 is a conceptual diagram illustrating the structure of the invention.

As shown in FIG. 14, the relationship between the homogeneous coordinates $x_p$ and the coordinates $u_p=(u_p, v_p, 1)^T$ of the projector image is defined as follows.

$$u_p = \begin{pmatrix} u_p \\ v_p \\ 1 \end{pmatrix} = A_p \begin{pmatrix} x_p \\ y_p \\ 1 \end{pmatrix} \quad \text{[Equation 4]}$$

Here, $A_p$ is a matrix (a pseudo-intrinsic matrix of the projector) indicating conversion between the homogeneous coordinates $x_p$ and the coordinates $u_p$ of the projector image and is represented as follows using the zoom f of the projector.

$$A_p = \begin{pmatrix} f & 0 & 0 \\ 0 & f & 0 \\ 0 & 0 & 1 \end{pmatrix} \quad \text{[Equation 5]}$$

Similarly, the relationship between the homogeneous coordinates $x_c=(x_c, y_c, 1)^T$ of the camera coordinates, and the coordinates $u_c=(u_c, v_c, 1)^T$ of the captured image and the camera coordinates is defined as follows.

$$x_c = \begin{pmatrix} x_c \\ y_c \\ 1 \end{pmatrix} = \begin{pmatrix} X'/Z' \\ Y'/Z' \\ 1 \end{pmatrix} \quad \text{[Equation 6]}$$

$$u_c = \begin{pmatrix} u_c \\ v_c \\ 1 \end{pmatrix} = A_c \begin{pmatrix} x_c \\ y_c \\ 1 \end{pmatrix} \quad \text{[Equation 7]}$$

However, $A_c$ is a matrix indicating conversion between the homogeneous coordinates and the coordinates of the captured image, is called a camera intrinsic parameter, and indicates a focal length or the aspect ratio of a pixel in the CCD. The camera intrinsic parameter is given by the following matrix in advance.

$$A_c = \begin{pmatrix} \alpha_v & s & u_0 \\ 0 & \alpha_s & v_0 \\ 0 & 0 & 1 \end{pmatrix} \quad \text{[Equation 8]}$$

The screen plane L is represented as follows using the projector coordinate system.

$$Z = pX + qY + r \quad \text{[Equation 9]}$$

Here, p, q, and r are parameters characterizing the plane and are represented by the distance between the screen and the projector and the inclination of the screen plane. In this case, as shown in FIG. 12, a point $x_p$ at the coordinates of the projector image is projected to the plane L and is captured as a point $x_c$ at the coordinates of the captured image. In this case, the relationship between $x_p$ and $x_c$ is represented as follows.

$$x_c \propto T x_p \quad \text{[Equation 10]}$$

However, T is a 3×3 matrix and is represented as follows using the rotation R, the translation $X_0$, and the plane parameters p, q, and r. In addition, ∝ indicates that the vector on the right side is proportional to the vector on the left side (which holds for the following description).

$$T = \left[ rI + \begin{pmatrix} p \\ q \\ -1 \end{pmatrix} ( X_0 \ Y_0 \ Z_0 ) \right] R \quad \text{[Equation 11]}$$

According to [Equation 4], [Equation 7], and [Equation 10], a point $u_p$ (a point on the coordinates of the projector image) on the projector image and a point $u_c$ (a point on the coordinates of the captured image) on the captured image satisfy the following equation.

$$u_c \propto A_c T A_p^{-1} u_p \quad \text{[Equation 12]}$$

According to [Equation 12], conversion (and inverse conversion) from the point $u_c$ on the captured image to the point $u_p$ on the projector image can be described using the intrinsic parameter $A_c$, zoom f, rotation R, and translation $X_0$ of the camera. In this embodiment, the values of the intrinsic parameter $A_c$, the rotation R, and the translation $X_0$ are predetermined and only the plane parameters p, q, and r and the zoom f are unknown variables. The projector plane parameter estimation unit 102 determines the plane parameters p, q, and r and the zoom f of the projector such that some points on the straight lines detected by the projection image frame detection unit 101, for example, all points on the detected straight lines satisfy the relational expression of [Equation 12].

Specifically, first, the projector plane parameter estimation unit 102 converts N coordinate data items $\{u_{pk}\} = (u_{p1}, u_{p2}, \ldots, u_{pN})$ which are sampled from the straight lines corresponding to the frame of the projector image at the coordinates of the projector image into coordinate data at the coordinates of the captured image using [Equation 12]. The N coordinate data items can be, for example, the vertexes of the frame (intersection points between two straight lines) or the middle points of four straight lines. Then, the projector plane parameter estimation unit 102 determines the plane parameters p, q, and r the zoom f of the projector such that the converted N coordinate data items are approximate to N coordinate data items (for example, intersection points between two straight lines or the middle points of four straight lines) corresponding to four detected straight lines at the coordinates of the captured image. For example, the projector plane parameter estimation unit 102 may determine the plane parameters p, q, and r the zoom f of the projector such that the error function E represented by [Equation 13] is the minimum or such that the error function E is less than a predetermined value $E_0$. For example, when there are M coordinate data items, the predetermined value $E_0$ may be $\epsilon/M$. In addition, $\epsilon$ is a positive real number that is sufficiently less than 1 and is a design choice which can be determined by the user in advance.

$$E(p, q, r, f) = \sum_k \| u_{ck} - F(A_c T A_p^{-1} u_{pk}) \|^2 \quad \text{[Equation 13]}$$

However, F(•) is a function which has a 3×1 vector as an argument and outputs a vector which has, an element, a value obtained by dividing all components by an element of a third component of an argument vector. For example, when $X = (X, Y, Z)^T$ is an argument, F(X) is $(X/Z, Y/Z, 1)^T$.

The coordinate data sampled from the detected straight lines may be converted into coordinates on the projector image on the basis of the above and the above-mentioned process may be performed.

The projector plane parameter estimation unit 102 stores the plane parameters p, q, and r and the zoom f in the memory (not shown). In contrast, when the projection image frame detection unit 101 outputs the frame detection failure flag, the projector plane parameter estimation unit 102 does not estimate the plane parameters, generates a plane parameter estimation failure flag, and stores the plane parameter estimation failure flag in the memory (not shown).

The projection pattern generation unit 103 sets the coordinate axis of a virtual screen, using the distance between the screen and the projector and the inclination of the screen with respect to the optical axis of the projector which are estimated by the projector plane parameter estimation unit 102. Then, the projection pattern generation unit 103 calculates the projection position of a plurality of arbitrary points on the projector image onto the virtual screen using the zoom ratio of the projector which is estimated by the projector plane parameter estimation unit 102. Then, the projection pattern generation unit 103 generates a projector image which is corrected such that the screen-projected image is not distorted, using the above-mentioned results. This process will be described in detail below.

Figure 15:
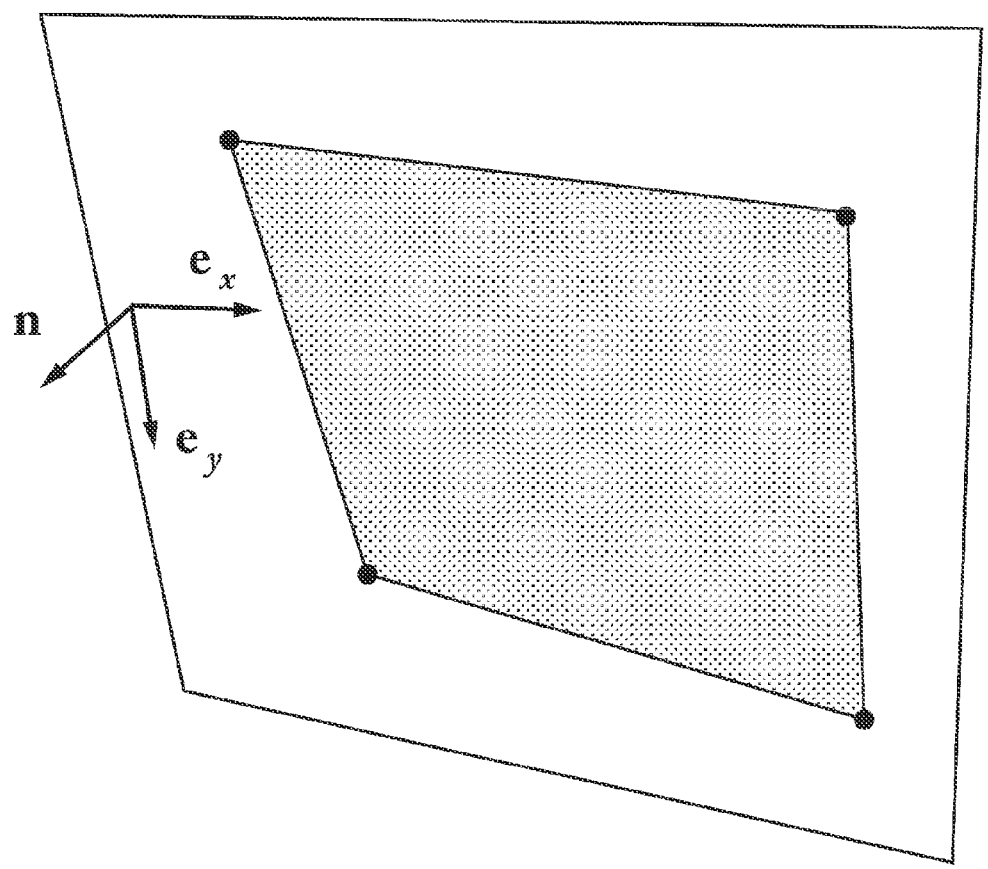
FIG. 15 is a conceptual diagram illustrating the structure of the invention.

First, as shown in FIG. 15, the projection pattern generation unit 103 determines two unit vectors $e_x$ and $e_y$ which are tangent to the screen and are perpendicular to each other as vectors perpendicular to a normal vector, on the basis of the inclination of the plane estimated by the projector plane parameter estimation unit 102 (a normal vector n: the inclination of the screen with respect to the optical axis of the projector). At that time, the x-axis and the y-axis (the coordinate axes of the virtual screen) in the screen coordinate system are $e_x$ and $e_y$, by the definition of the screen coordinate system, respectively.

Figure 16:
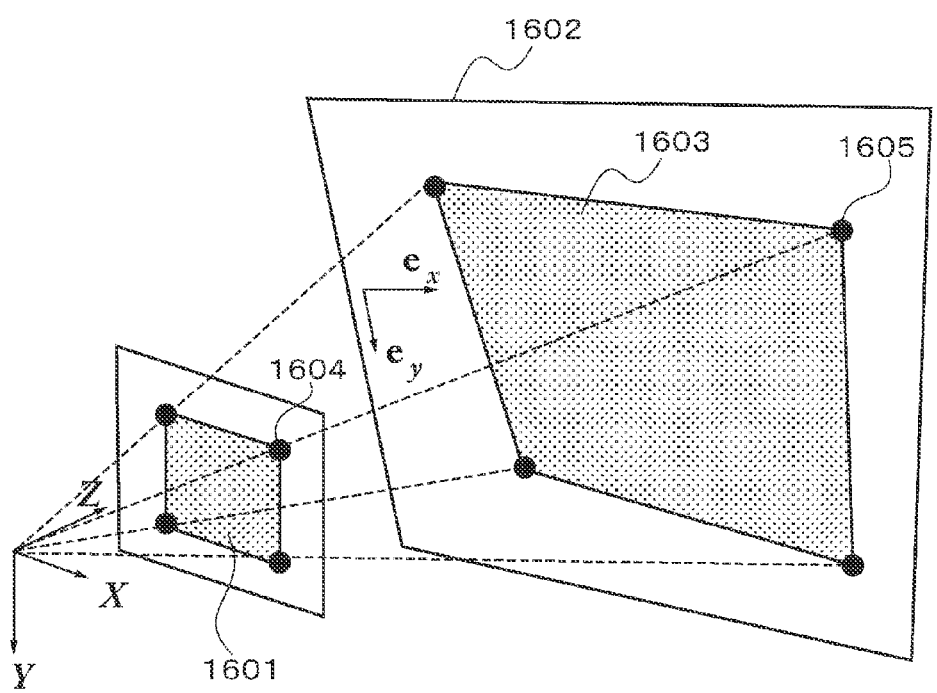
FIG. 16 is a conceptual diagram illustrating the structure of the invention.

Then, as shown in FIG. 16, the projector plane parameter estimation unit 102 estimates points on the screen-projected image which correspond to a plurality of arbitrary points on the projector image, for example, four corner points. Specifically, the projector plane parameter estimation unit 102 has a conversion rule for converting the coordinate data of the projector image at the coordinates of the projector image into coordinate data at the coordinates of the virtual screen. Then, the projector plane parameter estimation unit 102 converts a plurality of arbitrary points (example: four corner points) of the projector image at the coordinates of the projector image into coordinate data at the coordinates of the virtual screen using the conversion rule. Then, the projector plane parameter estimation unit 102 estimates the converted coordinate data as points on the screen-projected image which correspond to a plurality of arbitrary points of the projector image.

The content of the conversion rule is as follows. For example, as shown in FIG. 16, an expression for a straight line which connects the optical center of the screen and an arbitrary point of the projector image (example: one of four vertices of the frame of the projector image) may be calculated and an intersection point between the straight line and the x-y plane of the coordinate system of the virtual screen may be calculated. For example, in FIG. 16, when a projector image 1601 is projected onto a screen 1602 and becomes a screen-projected image 1603, the coordinate values of points 1605 on the screen-projected image which correspond to four vertices 1604 of the frame of the projector image are calculated in the screen coordinate system.

Next, the structure of the projection pattern generation unit 103 correcting the projector image such that the screen-projected image is not distorted will be described.

First, the projection pattern generation unit 103 compares a shape (example: a rectangle formed by connecting four vertices of the frame of the projector image) formed by connecting a plurality of arbitrary coordinate points of the projector image (example: four vertices of the frame of the projector image) at the coordinates of the projector image with a shape formed by connecting a plurality of coordinate points in the coordinate system of the virtual screen which are converted from the plurality of coordinate points and corrects the plurality of coordinate points in the coordinate system of the virtual screen such that the shapes are substantially identical to each other. For example, when the coordinate points of four vertices of the frame of the projector image are converted as described above, the projection pattern generation unit 103 corrects the coordinate points such that four corners of the rectangle formed by connecting the converted four coordinate points have a right angle and the aspect ratio is equal to that of the frame of the projector image.

Figure 17:
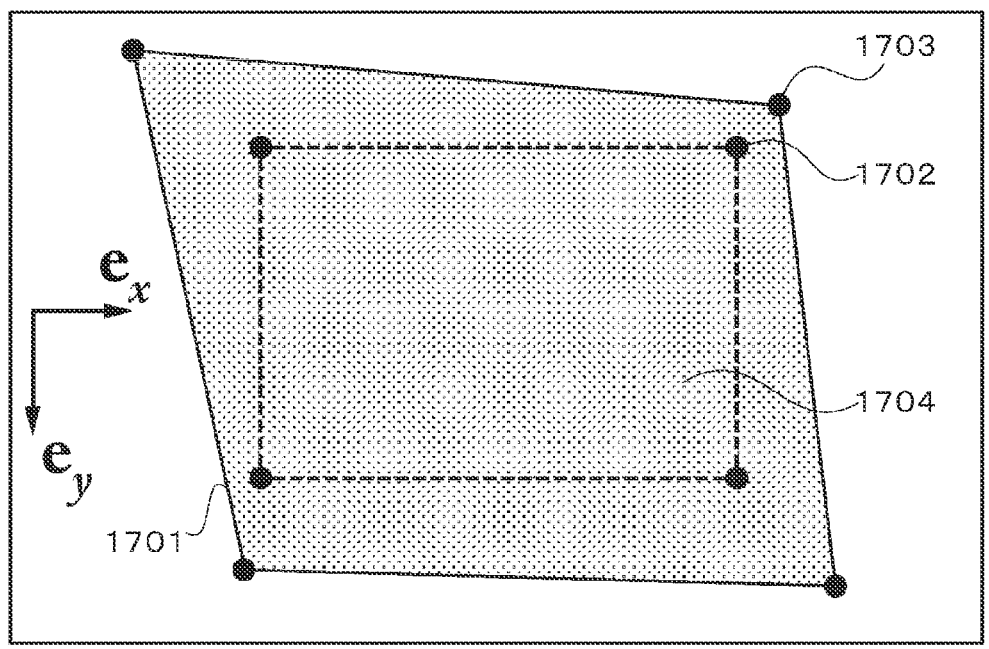
FIG. 17 is a conceptual diagram illustrating the structure of the invention.

Next, an example will be described with reference to FIG. 17. FIG. 17 shows a rectangle (a screen-projected image 1701 before correction) formed by points in the coordinate system of the virtual screen which are converted from four vertices of the frame of the projector image. The projection pattern generation unit 103 corrects the coordinate data of four vertices (for example, 1703) of the screen-projected image 1701 before correction such that four corners of the screen-projected image 1701 before correction have a right angle and the aspect ratio thereof is equal to that of the frame of the projector image, thereby obtaining a corrected screen-projected image 1704.

Figure 18:
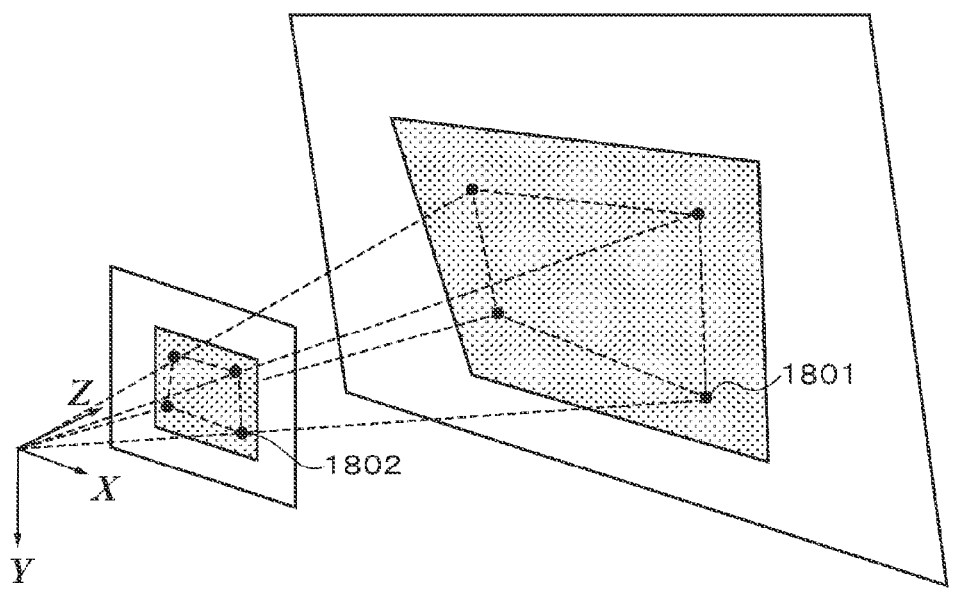
FIG. 18 is a conceptual diagram illustrating the structure of the invention.

Then, as shown in FIG. 18, the projection pattern generation unit 103 converts the coordinate data of four vertices (for example, 1801) of the corrected screen-projected image 1704 into coordinate data at the coordinates of the projector image. For example, the projection pattern generation unit 103 calculates an expression for four straight lines which connect four vertices (for example, 1801) of the corrected screen-projected image 1704 and the optical center of the projector and calculates intersection points between the straight lines and the x-y plane at the coordinates of the projector image, thereby calculating coordinate data (for example, 1802 in FIG. 18) at the coordinates of the projector image which correspond to four vertices (for example, 1801 in FIG. 18) of the corrected screen-projected image 1704.

Figure 19:
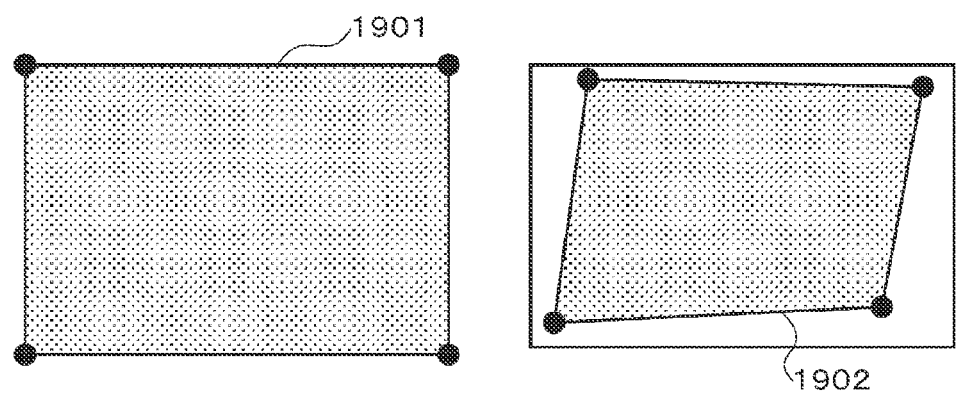
FIG. 19 is a conceptual diagram illustrating the structure of the invention.

Then, as shown in FIG. 19, the projection pattern generation unit 103 calculates a conversion expression (nomography) for converting four vertices of a projector image (1901 in FIG. 19) before correction into four vertices of a corrected projector image and converts the entire projector image using the calculated conversion expression to generate a distortion-corrected projector image (1902 in FIG. 19). The projection pattern generation unit 103 stores the generated corrected image in the memory (not shown). When the projector plane parameter estimation unit outputs the plane parameter estimation failure flag, the projection pattern generation unit 103 stores the projector image in the memory (not shown) without correcting the projector image.

Figure 2:
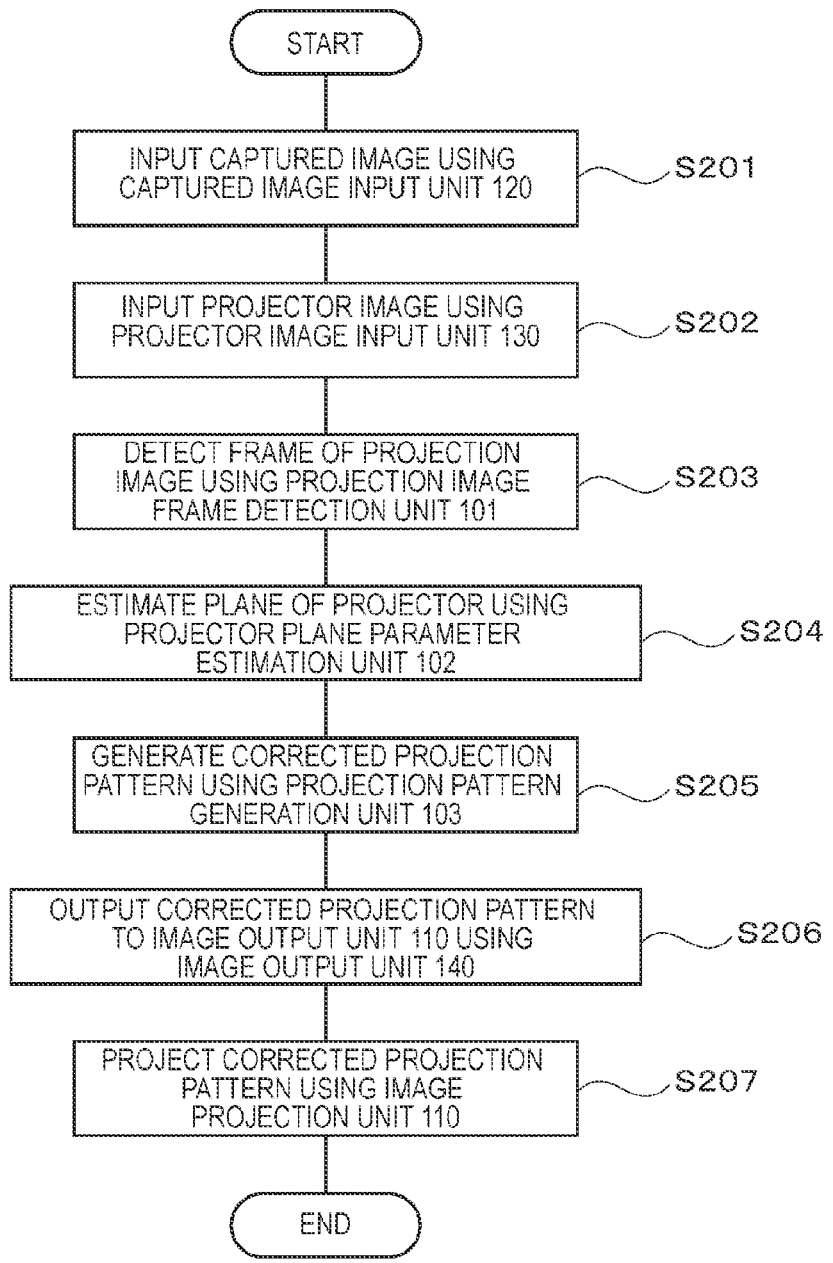
FIG. 2 is a flowchart illustrating an example of the flow of a process of an automatic projection image correction method according to the first embodiment.

Next, the overall operation of this embodiment will be described in detail with reference to the flowchart shown in FIG. 2.

First, the captured image input unit 120 inputs a captured image (S201). Then, the projector image input unit 130 inputs a projector image (S202). The projection image frame detection unit 101 detects the frame of a screen-projected image (S203). Then, the projector plane parameter estimation unit 102 estimates the plane of the projector (S204). The projection pattern generation unit 103 generates a corrected projection pattern (S205). Then, the image output unit 140 outputs the corrected projection pattern to the image projection unit 110 (S206). Finally, the image projection unit 110 processes the corrected projection pattern (S207).

For example, the automatic projection image correction system 1 according to this embodiment can be implemented by installing the following program in a computer.

A program causes a computer to function as: a projection image frame detection unit that detects straight lines forming a frame of a screen-projected image which is projected onto a screen by a projector from a captured image obtained by capturing the screen-projected image using a camera; and a projector plane parameter estimation unit that sets coordinate axes to a projector image, which is an original image of the screen-projected image, and the captured image and estimates at least one of a distance the screen and the projector, an inclination of the screen with reference to an optical axis of the projector, and a zoom ratio of the projector, using the inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

Next, the effects of this embodiment will be described. The straight lines forming the frame of the screen-projected image in the captured image are detected. The distance between the screen and the projector and the inclination of the plane of the screen are calculated from the position of the detected straight lines forming the frame, and the screen-projected image in which the angle and the aspect ratio are corrected is generated from the calculated distance between the screen and the projector and the calculated inclination of the plane of the screen. According to this structure, since the screen-projected image is corrected using the straight lines forming the frame of the screen-projected image in the captured image, it is not necessary to superimpose a calibration pattern on the screen-projected image. Therefore, it is possible to correct the distortion of the screen-projected image, without reducing visibility. In addition, in this embodiment, since the screen-projected image is corrected from the straight lines forming the frame of the screen-projected image in the captured image, it is possible to correct the screen-projected image, without depending on the pattern in the screen-projected image. Therefore, it is possible to correct the distortion of the screen-projected image even in images other than a still image.

<Second Embodiment>

Figure 3:
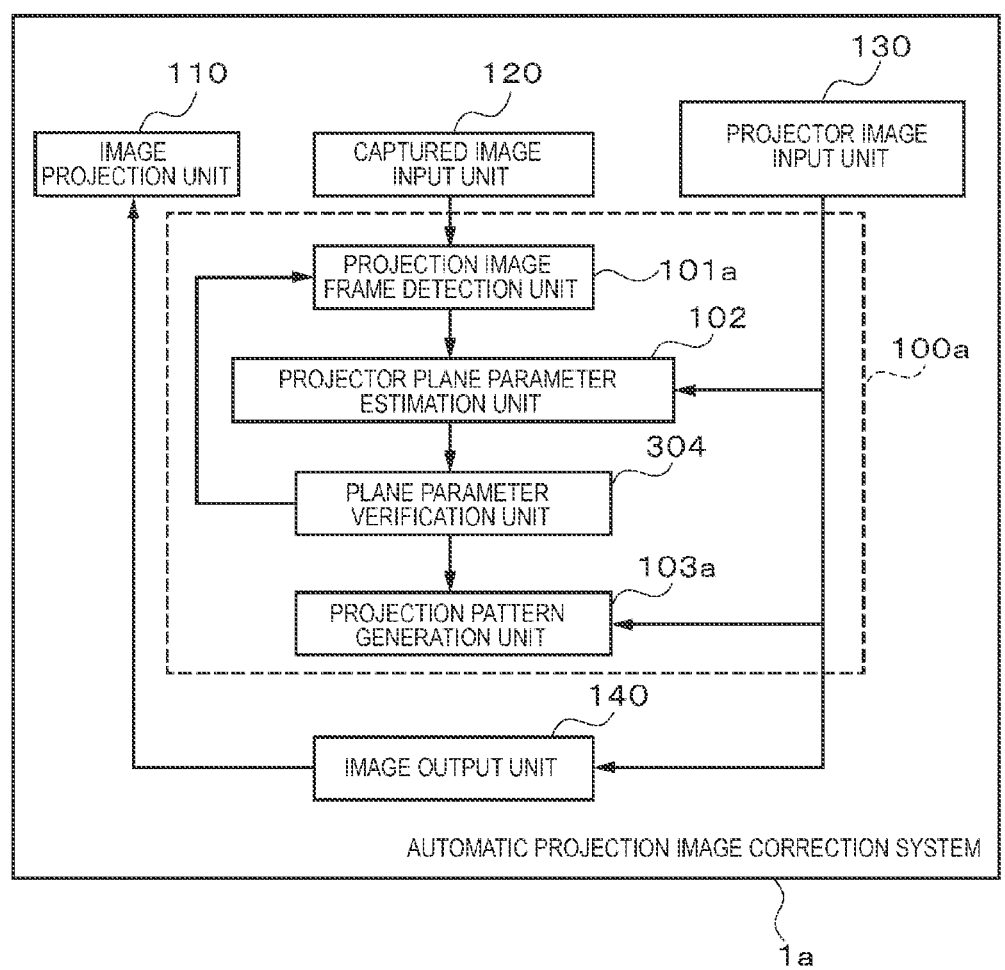
FIG. 3 is an example of a functional block diagram illustrating an automatic projection image correction system according to a second embodiment.

Referring to FIG. 3, an automatic projection image correction system 1a according to a second embodiment of the invention includes a computer (a central processing unit; a processor; or a data processing device) 100a which is operated by a program control, an image projection unit 110, a captured image input unit 120, a projector image input unit 130, and an image output unit 140. The computer (a central processing unit; a processor; or a data processing device) 100a includes a projection image frame detection unit 101a, a projector plane parameter estimation unit 102, a plane parameter verification unit 304, and a projection pattern 103a.

The outline of the operation of each unit is as follows. The image projection unit 110, the captured image input unit 120, the projector image input unit 130, the image output unit 140, the projector plane parameter estimation unit 102, and the projection pattern generation unit 103a are the same as those according to the first embodiment and the description thereof will not be repeated.

When a projection image frame re-detection flag is not generated by the plane parameter verification unit 304, which will be described below, the projection image frame detection unit 101a detects the frame of a screen-projected image using the same method as that in the first embodiment. On the other hand, when the projection image frame re-detection flag is generated, the detected straight lines are excluded and the frame is detected again by the same method as that in the first embodiment.

The plane parameter verification unit 304 determines whether plane parameters p, q, and r and a zoom f which are estimated by the projector plane parameter estimation unit 102 are correct. Specifically, the plane parameter verification unit 304 stores data indicating the numerical range of the plane parameters p, q, and r and the zoom f in advance and determines whether the values estimated by the projector plane parameter estimation unit 102 are included in the numerical range. When all of the plane parameters and the zoom are in a predetermined numerical range, the plane parameter verification unit 304 determines that the plane parameters and the zoom are correct. When the plane parameters and the zoom are beyond the range, the plane parameter verification unit 304 determines that the plane parameters and the zoom are incorrect.

When it is determined that the estimated plane parameters p, q, and r and the zoom f are correct, the estimated values are stored in a memory (not shown). When it is determined that the estimated values are incorrect, the projection image frame re-detection flag is generated and stored in the memory (not shown). In this embodiment, the detection of the frame by the projection image frame detection unit 101a and the verification of the estimation parameter by the plane parameter verification unit 304 may be repeatedly performed until the estimation parameter is determined to be correct, or they may be performed a predetermined number of times. When the detection and the verification are performed a predetermined number of times, the plane parameter verification unit 304 generates a plane parameter estimation failure flag, without estimating the plane parameters, and stores the plane parameter estimation failure flag in the memory (not shown).

When the plane parameter verification unit 304 does not output the plane parameter estimation failure flag, the projection pattern generation unit 103a generates a projector image which is corrected such that the screen-projected image is not distorted, using the same method as that in the first embodiment, and stores the projector image in the memory (not shown). On the other hand, when the plane parameter verification unit 304 outputs the plane parameter estimation failure flag, a projector image in which distortion is not corrected is stored in the memory (not shown).

Figure 4:
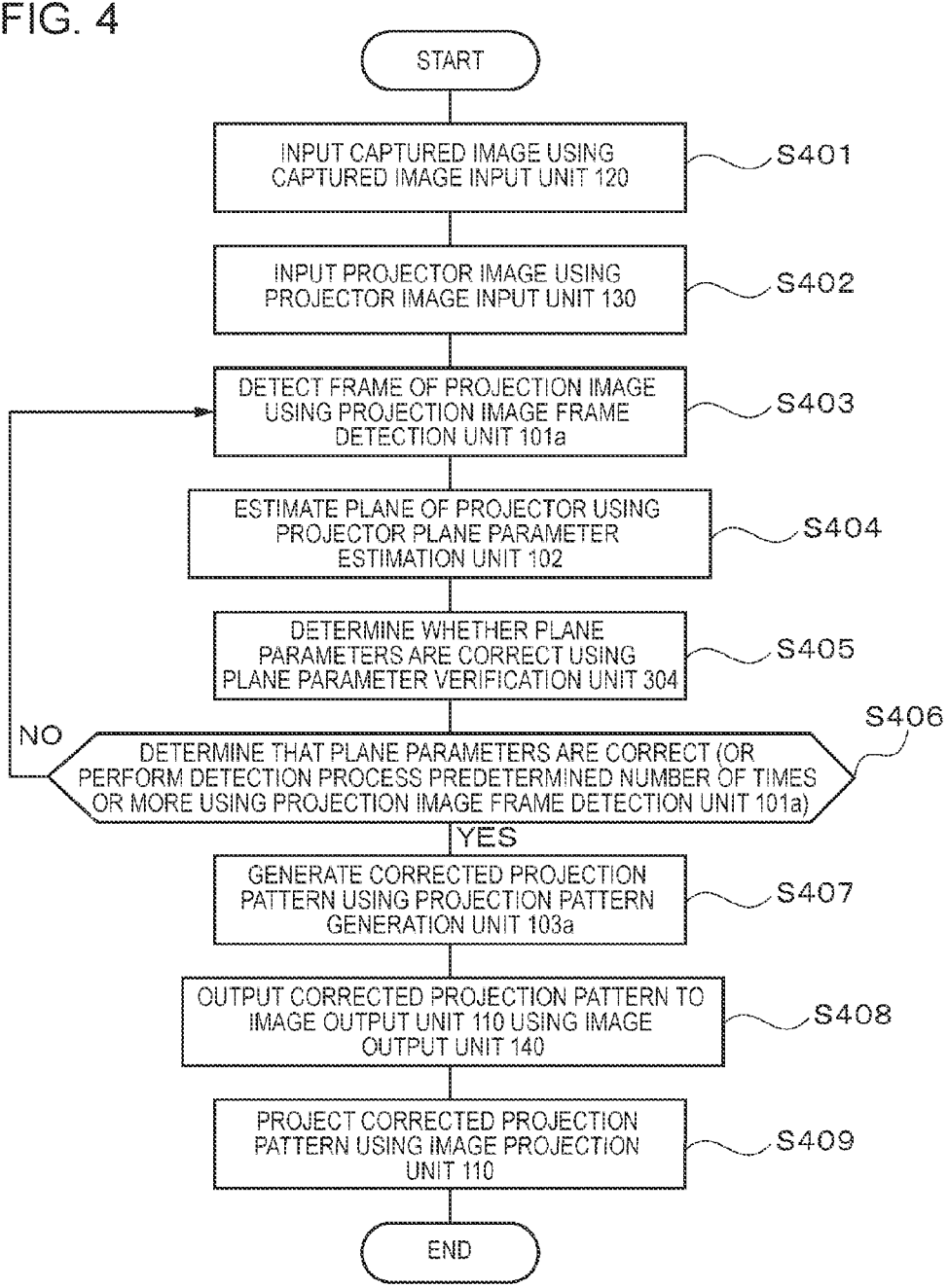
FIG. 4 is a flowchart illustrating an example of the flow of a process of an automatic projection image correction method according to the second embodiment.

Next, the overall operation of this embodiment will be described in detail with reference to the flowchart shown in FIG. 4.

First, the captured image input unit 120 inputs a captured image (S401). Then, the projector image input unit 130 inputs a projector image (S402). The projection image frame detection unit 101a detects the frame of a screen-projected image (S403). Then, the projector plane parameter estimation unit 102 estimates the plane of the projector (S404). The plane parameter verification unit 304 determines whether a plane parameter is correct (S405). When the value of the plane parameter is correct (or when the number of detection processes by the projection image frame detection unit 101a is equal to greater than a predetermined value), the projection image pattern generation unit 103a generates a corrected projection pattern (S407). In the other cases, the projection image frame detection unit 101a detects the frame of the screen-projected image again (S406). Then, the image output unit 140 outputs the corrected projection pattern to the image projection unit 110 (S408). Finally, the image projection unit 110 projects the corrected projection pattern (S409).

In this embodiment, the plane parameter verification unit 304 determines whether the plane parameters p, q, and r and the zoom f calculated by the projector plane parameter estimation unit 102 are correct. Only when it is determined that the plane parameters and the zoom are correct, the projection pattern generation unit 103a corrects the distortion of the screen-projected image. Therefore, it is possible to prevent a projection image from being corrected to an incorrect form, as compared to the first embodiment.

<Third Embodiment>

Figure 5:
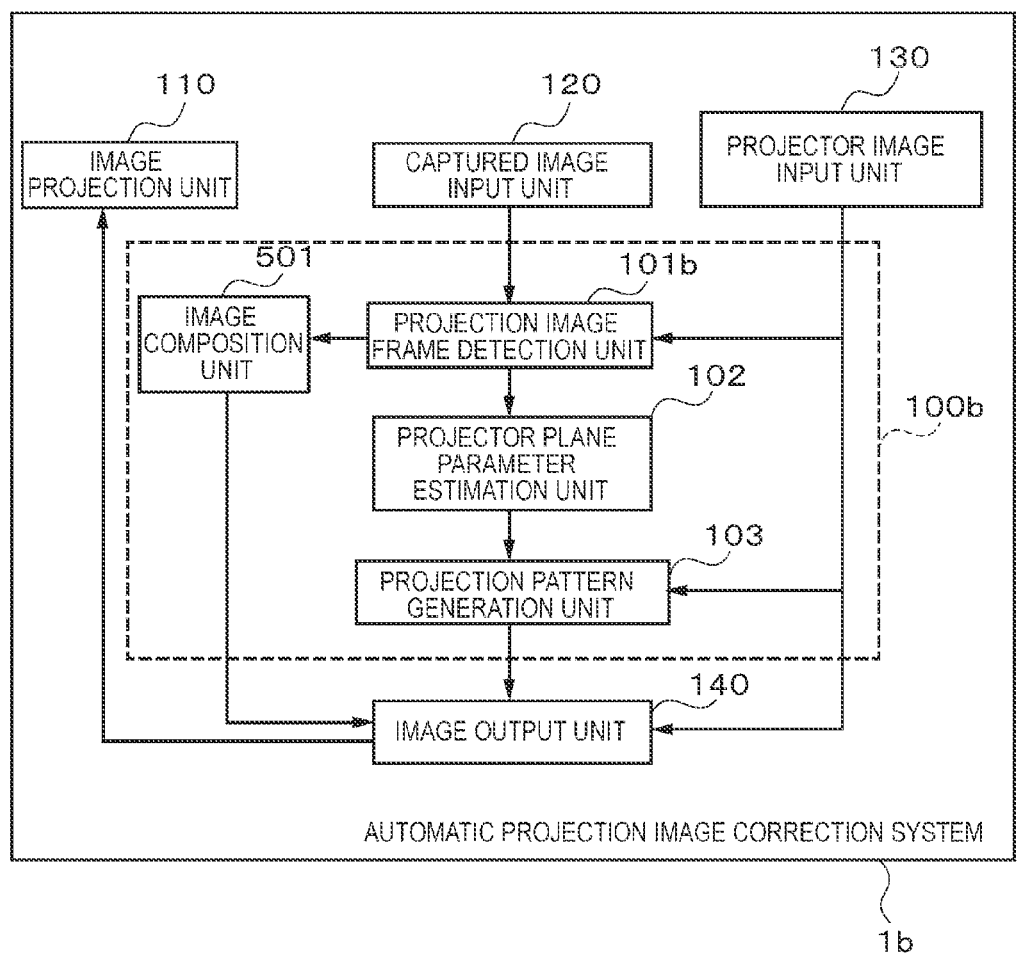
FIG. 5 is an example of a functional block diagram illustrating an automatic projection image correction system according to a third embodiment.

Referring to FIG. 5, an automatic projection image correction system 1b according to a third embodiment of the invention includes a computer (a central processing unit; a processor; or a data processing device) 100b which is operated by program control, an image projection unit 110, a captured image input unit 120, a projector image input unit 130, and an image output unit 140. The computer (a central processing unit; a processor; or a data processing device) 100b includes a projection image frame detection unit 101b, a projector plane parameter estimation unit 102, an image composition unit 501, and a projection pattern 103.

The outline of the operation of each unit is as follows. The image projection unit 110, the captured image input unit 120, the projector image input unit 130, the projector plane parameter estimation unit 102, the projection pattern generation unit 103, and the image output unit 140 are the same as those in the first embodiment and the description thereof will not be repeated.

Figure 20:
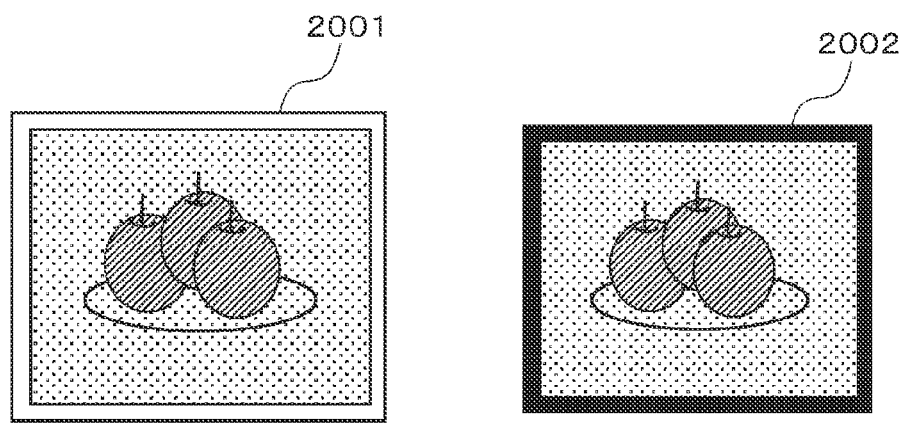
FIG. 20 is a conceptual diagram illustrating the structure of the invention.

When the projection image frame detection unit 101b, which will be described below, fails to detect the frame of the screen-projected image and an initial projection image frame detection failure flag is generated, the image composition unit 501 composes the image of the frame with the projector image to generate an image (hereinafter, referred to as a composite image) and stores the composite image in the memory (not shown), in order to enable the projection image frame detection unit 101b to accurately detect the frame. An image in which a predetermined number of pixels from the outer frame of the projector image to the inside of the projector image are painted a predetermined color (for example, white or black) is used as the composite image. The image composition unit 501 may generate one or a plurality of composite images. Next, an example in which an image in which a predetermined number of pixels from the outer frame of the projector image to the inside of the projector image are painted white (2001 in FIG. 20) and black (2002 in FIG. 20) is generated as the composite image as shown in FIG. 20 will be described. A region which is highlighted with a predetermined color is an edge region of the projector image and the possibility of content being included in the edge region is low. Therefore, even when a projector image in which the edge region is painted a predetermined color is projected, the visibility of the viewer is not reduced.

When the image composition unit 501 does not generate the composite image, the projection image frame detection unit 101b detects the frame of the screen-projected image using the same method as that in the first embodiment. When the detection of the frame of the screen-projected image succeeds, the position of the detected frame is stored in the memory (not shown).

Figure 21:
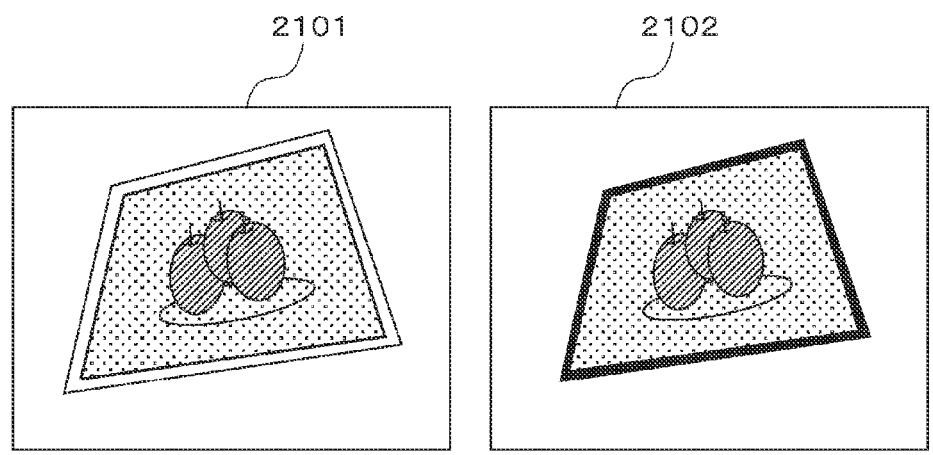
FIG. 21 is a conceptual diagram illustrating the structure of the invention.
Figure 22:
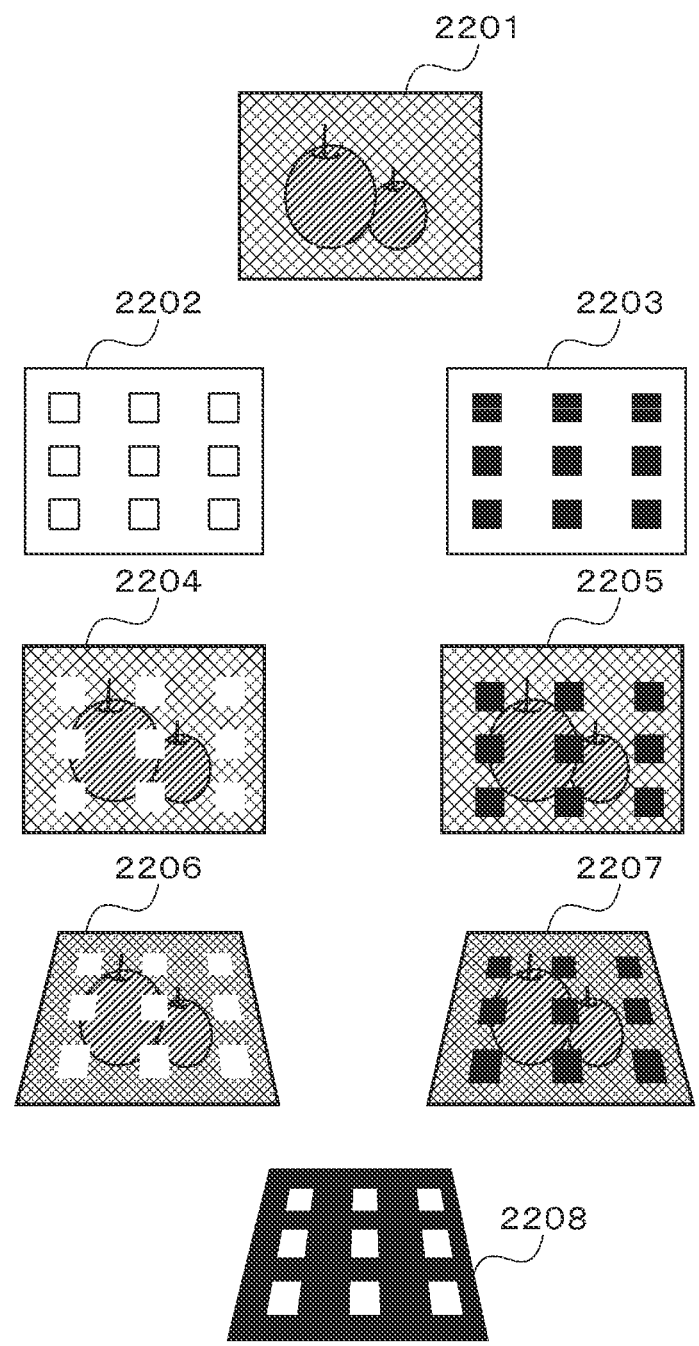
FIG. 22 is a diagram illustrated in Patent Document 1.

On the other hand, when the detection of the frame of the screen-projected image fails, the initial projection image frame detection failure flag is generated and stored in the memory (not shown). Then, the image composition unit 501 generates a composite image and the frame is detected by the following process. First, the image output unit 140 outputs the composite image 2001 to the image projection unit 110 and the image projection unit 110 projects the composite image 2001 onto the screen. The frame of the screen-projected image is detected by the same method as that in the first embodiment, using a captured image (2101 in FIG. 21) of the composite image. When the detection of the frame succeeds, the position of the detected frame is stored in the memory (not shown).

On the other hand, when the detection of the frame fails, the image output unit 140 outputs the composite image 2002 to the image projection unit 110 and the image projection unit 110 projects the composite image 2002 onto the screen. A difference image (hereinafter, referred to as a difference image (white and black)) between the captured image 2101 and the captured image 2102 is generated using a captured image (2102 in FIG. 21) of the composite image. The frame of the screen-projected image is detected from the difference image (white and black) using the same method as that in the first embodiment. When the detection of the frame succeeds, the position of the frame is stored in the memory (not shown). On the other hand, when the detection of the frame fails, a projection image frame detection failure flag is generated and stored in the memory (not shown).

Figure 6:
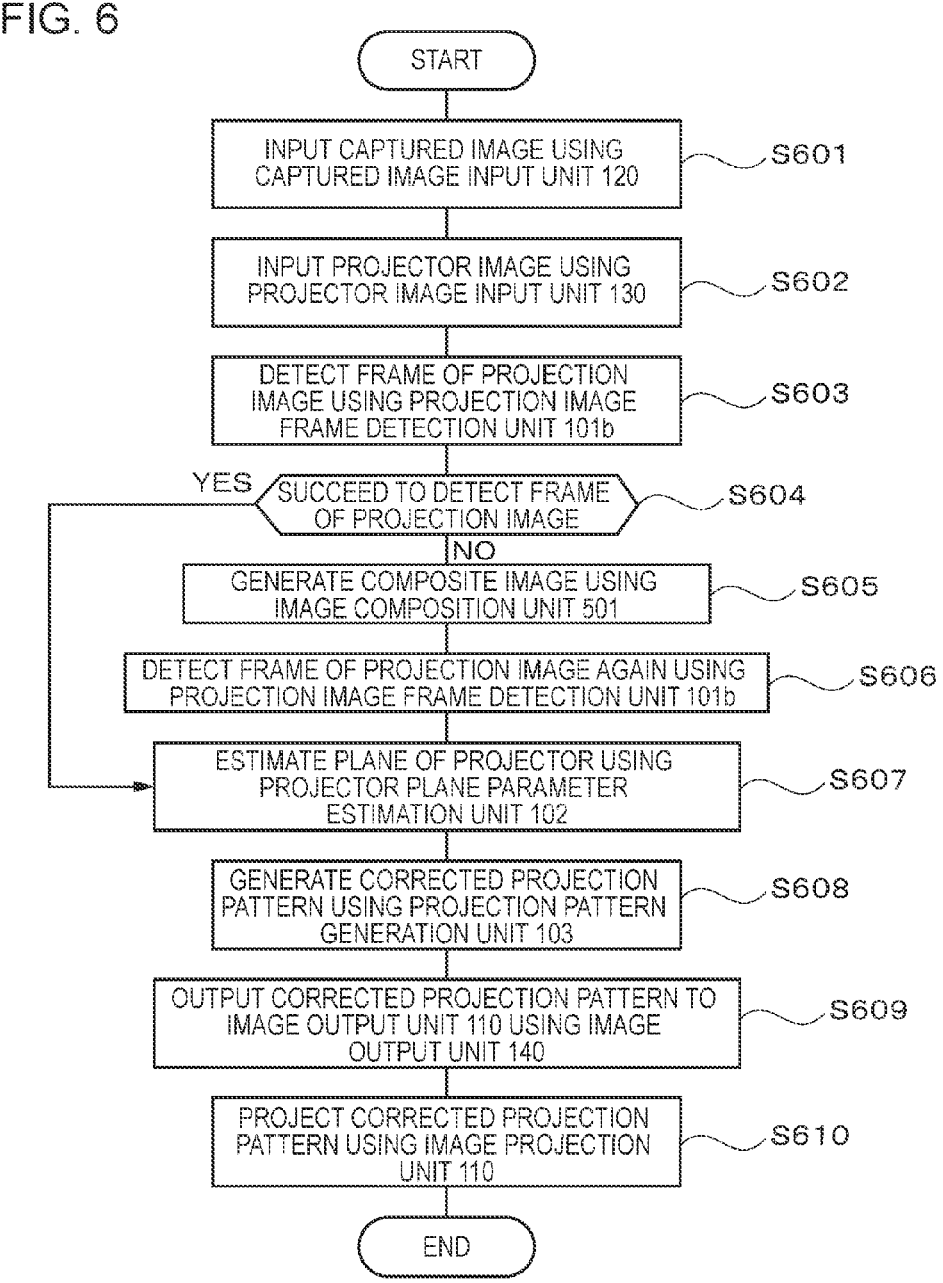
FIG. 6 is a flowchart illustrating an example of the flow of a process of an automatic projection image correction method according to the third embodiment.

Next, the overall operation of this embodiment will be described in detail with reference to the flowchart shown in FIG. 6.

First, the captured image input unit 120 inputs a captured image (S601). Then, the projector image input unit 130 inputs a projector image (S602). The projection image frame detection unit 101b detects the frame of a screen-projected image (S603). When the detection of the frame of the screen-projected image succeeds, the process proceeds to 5607, which will be described below. On the other hand, when the detection of the frame fails, the image composition unit 501 generates a composite image (S605). Then, the projection image frame detection unit 101b detects the frame of the screen-projected image again (S606). The projector plane parameter estimation unit 102 estimates the plane of the projector (S607). The projection pattern generation unit 103 generates a corrected projection pattern (S608). Then, the image output unit 140 outputs the corrected projection pattern to the image projection unit 110 (S609). Finally, the image projection unit 110 projects the corrected projection pattern (S409).

In this embodiment, the image composition unit 501 generates the composite image in which the frame region of the projector image is highlighted and the image projection unit 110 projects the composite image onto the screen. The projection image frame detection unit 101b detects the frame of the screen-projected image from the captured image obtained by capturing the screen-projected image with a highlighted frame region using a camera. Therefore, it is possible to robustly detect the frame, without reducing visibility, as compared to the first embodiment. In this embodiment, since the frame of the screen-projected image can be robustly detected, it is possible to robustly correct the distortion of the screen-projected image, as compared to the first embodiment.

<Fourth Embodiment>

Figure 7:
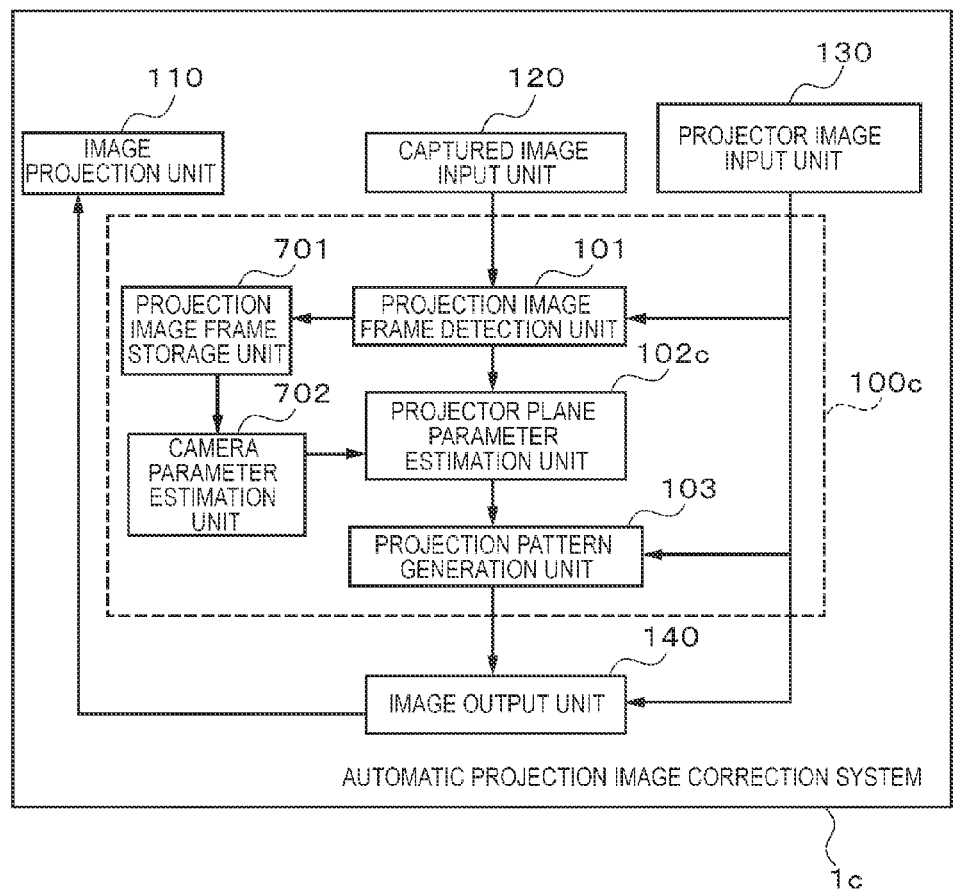
FIG. 7 is an example of a functional block diagram illustrating an automatic projection image correction system according to a fourth embodiment.
Figure 8:
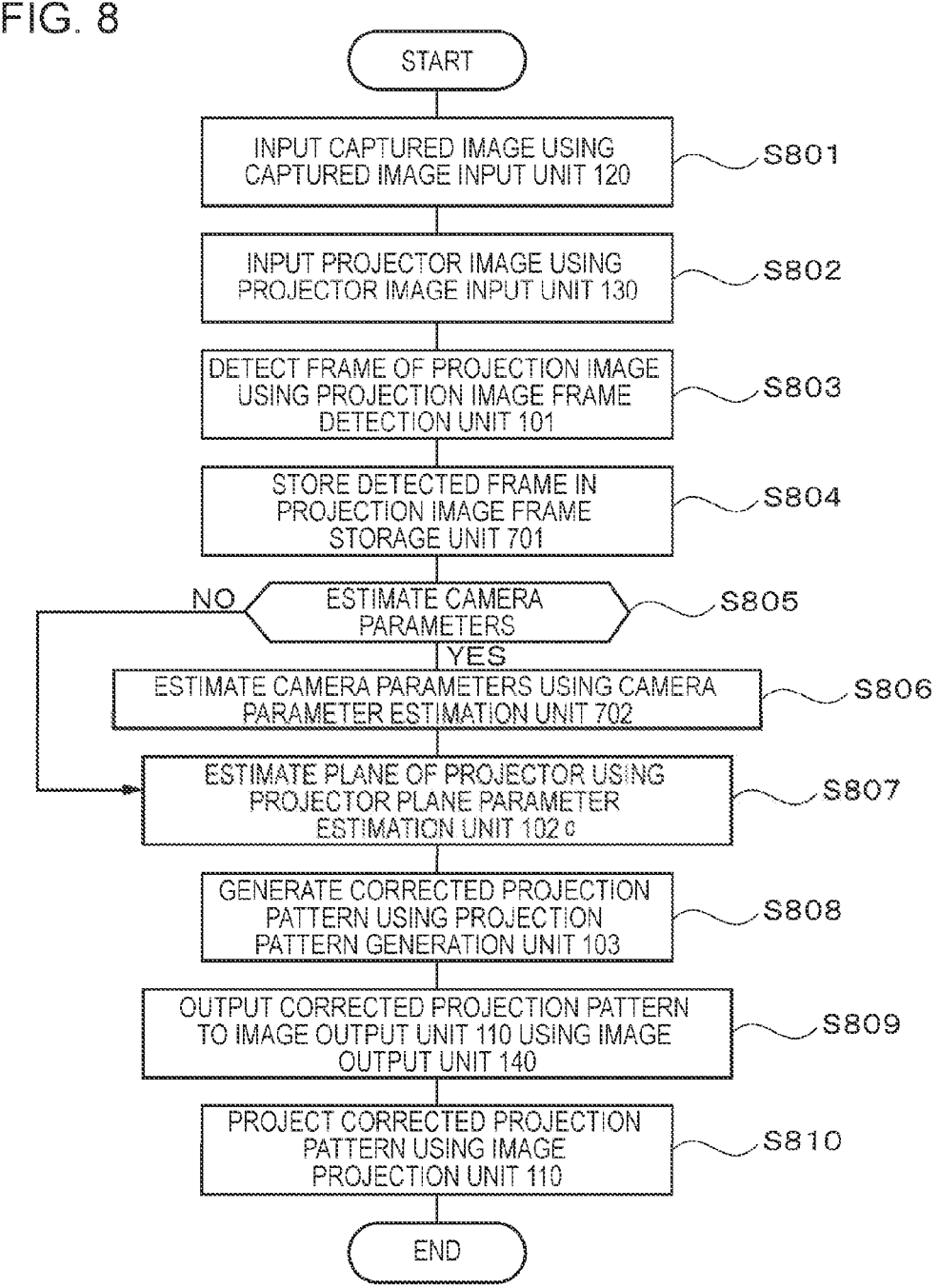
FIG. 8 is a flowchart illustrating an example of the flow of a process of an automatic projection image correction method according to the fourth embodiment.
Figure 9:
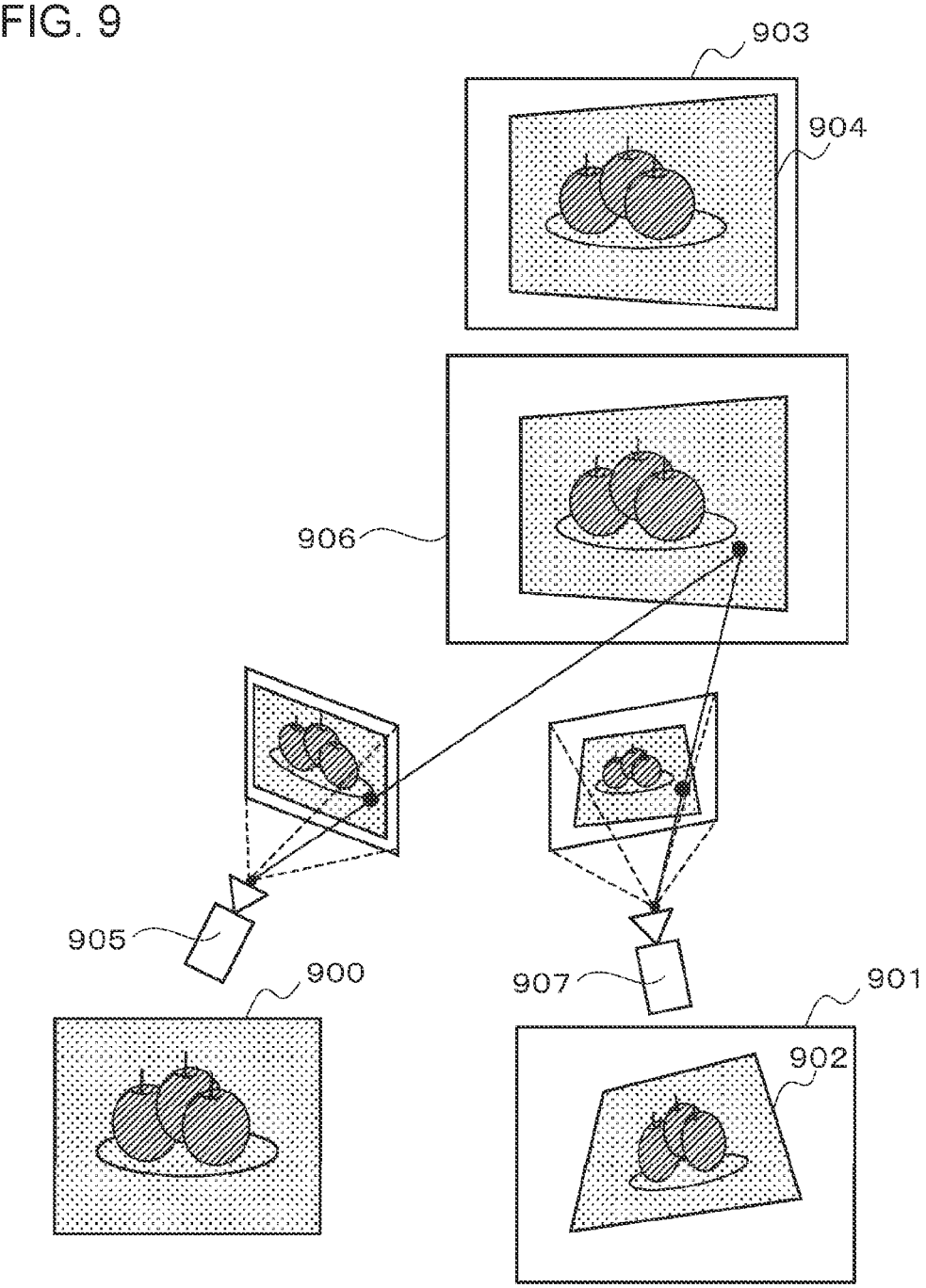
FIG. 9 is a conceptual diagram illustrating the structure of the invention.

Referring to FIG. 7, an automatic projection image correction system 1c according to a fourth embodiment of the invention includes a computer (a central processing unit; a processor; or a data processing device) 100c which is operated by program control, an image projection unit 110, a captured image input unit 120, a projector image input unit 130, and an image output unit 140. The computer (a central processing unit; a processor; or a data processing device) 100c includes a projection image frame detection unit 101c, a projector plane parameter estimation unit 102, a projection pattern generation unit 103, a projection image frame storage unit 701, and a camera parameter estimation unit 702.

The outline of the operation of each unit is as follows. The image projection unit 110, the captured image input unit 120, the projector image input unit 130, the projection image frame detection unit 101, the projection pattern generation unit 103, and the image output unit 140 are the same as those in the first embodiment and the description thereof will not be repeated.

The projection image frame storage unit 701 stores the position (coordinate data of the detected straight lines at the coordinates of a captured image) of the frame of a projection image which was detected by the projection image frame detection unit 101 in the past. At that time, the projection image frame storage unit 701 may store the position of the frames of all or some of the projection images which were detected in the past. For example, only when the position of the frame detected by the projection image frame detection unit 101 is greatly different from the position of all frames stored in the projection image frame storage unit 701, the projection image frame storage unit 701 may store the value of the position. Among the positions of the frames stored in the projection image frame storage unit 701 in the past, the value of the position of the frame after a lapse of a predetermined period of time may be removed from the memory. In the following description, it is assumed that the number of types of positions of the frames of the stored projection images is M and the positions are distinguished by a suffix m. For example, N point groups which are sampled from the frames detected from M types of screen-projected images are represented by $\{u_{cmk}\}=(u_{cm1}, u_{cm2}, \ldots, u_{cmN})$ and points groups in the projector image which correspond to the N point groups are represented by $\{u_{pmk}\}=(u_{pm1}, u_{p2}, \ldots, u_{pmN})$.

The camera parameter estimation unit 702 estimates the angle formed between the optical axes of the projector and the camera and the distance between the optical centers of the projector and the camera from the positions of the frames in a plurality of projection images stored in the projection image frame storage unit 701 (coordinate data of the detected straight lines at the coordinates of the captured image). This will be described in detail below.

In general, the positions of the frames stored in the projection image frame storage unit 701 are detected from the projection images with different zooms and different positional relationships between the screen and the projector. Hereinafter, in order to distinguish the positions of the frames, plane parameters corresponding to M types of stored frames are represented by $p_m$, $q_m$, and $r_m$ (m=1, ..., M) and the zoom thereof is represented by $f_{m\,(m=1,\ldots,M)}$. At that time, similarly to [Equation 11], the relationship between a point $u_{pmk}$ (a point on the coordinates of the projector image) in the projector image and a point $u_{cmk}$ (a point on the coordinates of the captured image) in the captured image is represented as follows, using matrices $T_m$ and $A_{pm}$ which are defined as follows.

$$T = \left[ r_m I + \begin{pmatrix} p_m \\ q_m \\ -1 \end{pmatrix} (X_0 \ Y_0 \ Z_0) \right] R \quad \text{[Equation 14]}$$

$$A_{pm} = \begin{pmatrix} f_m & 0 & 0 \\ 0 & f_m & 0 \\ 0 & 0 & 1 \end{pmatrix} \quad \text{[Equation 15]}$$

$$u_{cmk} \propto A_c T_m A_{pm}^{-1} u_{pmk} \quad \text{[Equation 16]}$$

[Equation 16] indicates that conversion from the point $u_{cmk}$ in the captured image to the point $u_{pmk}$ in the projector image can be described using a camera intrinsic parameter $A_c$, the plane parameters $p_m$, $q_m$, and $r_m$, the zoom $f_m$, rotation R, and translation $X_0$. In the camera parameter estimation unit 702, only the intrinsic parameter $A_c$ is given and the plane parameters $p_m$, $q_m$, and $r_m$, the zoom $f_m$, the rotation R, and the translation $X_0$ are unknown variables. The camera parameter estimation unit 702 minimizes an error function E represented by [Equation 17] to calculate the rotation R, the translation $X_0$, the plane parameters $p_m$, $q_m$, and $r_m$, and the zoom $f_m$ of the projector. The camera parameter estimation unit 702 may calculate the rotation R, the translation $X_0$, the plane parameters $p_m$, $q_m$, and $r_m$, and the zoom $f_m$ of the projector such that the error function E is less than a predetermined value (design choice).

$$E(R, X_0, p, q, r, f) = \sum_k \sum_m \|u_{cmk} - F(A_c T_m A_{pm}^{-1} u_{pmk})\|^2 \quad \text{[Equation 17]}$$

However, $F(\bullet)$ is a function which has a 3×1 vector as an argument and outputs a value obtained by dividing all components by an element of a third component of the vector, similarly to [Equation 13].

That is, the camera parameter estimation unit 702 can estimate the inclination of the optical axes of the projector and the camera and the distance between the optical centers of the projector and the camera, using the same method as that used by the projector plane parameter estimation unit 102 described in the first embodiment. Specifically, the camera parameter estimation unit 702 has a conversion rule for converting a point on the coordinates of the captured image into a point on the coordinates of the projector image, using inclination of the optical axes of the projector and the camera, the distance between the optical centers of the projector and the camera, the camera intrinsic parameter, the distance between the screen and the projector, the inclination of the screen with respect to the optical axis of the projector, and the zoom ratio of the projector. The camera parameter estimation unit 702 converts the coordinate data of the detected straight lines at the coordinates of the captured image in the arrangement of each screen into coordinate data at the coordinates of the projector image, using the value of the camera intrinsic parameter, which is a fixed value, and the values of the inclination of the optical axes of the projector and the camera, the distance between the optical centers of the projector and the camera, the distance between the screen and the projector in the arrangement of each screen, the inclination of the screen with respect to the optical axis of the projector in the arrangement of each screen, and the zoom ratio of the projector in the arrangement of each screen, which are indefinite values. Then, the camera parameter estimation unit 702 estimates a plurality of indefinite values such that the converted coordinate data is approximate to the coordinate data of the straight lines corresponding to the frame of the projector image at the coordinates of the projector image.

In addition, the camera parameter estimation unit 702 stores the plane parameters $p_m$, $q_m$, and $r_m$, the zoom $f_m$, the rotation R, and the translation $X_0$ in the memory (not shown). The camera parameter estimation unit 702 may estimate the plane parameters $p_m$, $q_m$, and $r_m$, the zoom $f_m$, the rotation R, and the translation $X_0$ whenever distortion is corrected or at an interval based on a predetermined rule. Alternatively, the camera parameter estimation unit 702 may estimate the values in response to instructions from the user.

The projector plane parameter estimation unit 102c calculates the plane parameters and the zoom of the projector from the camera intrinsic parameter $A_c$ which is given in advance, the angle formed between the optical axes of the projector and the camera and the distance between the optical centers of the projector and the camera (that is, the rotation R and the translation $X_0$) which are estimated by the camera parameter estimation unit 702, and the position of the frame of the projection image detected by the projection image frame detection unit 101, using the same method as that used by the projector plane parameter estimation unit 102 according to the first embodiment. The calculated plane parameters and zoom are stored in the memory (not shown).

Next, the operation of this embodiment will be described.

First, the captured image input unit 120 inputs a captured image (S801). Then, the projector image input unit 130 inputs a projector image (S802). The projection image frame detection unit 101 detects the frame of the projection image (S803). The projection image frame storage unit 701 stores the detected frame (S804). Then, when camera parameters are estimated using a plurality of frames stored in the projection image frame storage unit 701, the process proceeds to S806, which will be described below. When the camera parameters are not estimated, the process proceeds to S807, which will be described below (S805). The camera parameter estimation unit 702 estimates the camera parameters from the position of the plurality of frames stored in the projection image frame storage unit 701 (S806). Then, the projector plane parameter estimation unit estimates the plane parameters of the projector (S807). The projection pattern generation unit 103 generates a corrected projection pattern (S808). Then, the image output unit 140 outputs the corrected projection pattern to the image projection unit 110 (S809). Finally, the image projection unit 110 projects the corrected projection pattern (S810).

The projection image frame storage unit 701 stores the positions of the frames of the screen-projected image projected from a plurality of different screen positions and the angle formed between the optical axes of the projector and the camera and the distance between the optical axes of the projector and the camera are estimated from the stored positions of the plurality of frames. In the fourth embodiment, the angle formed between the optical axes of the projector and the camera and the distance between the optical axes of the projector and the camera are estimated during a process of correcting the screen-projected image. Therefore, even when there are errors in the predetermined angle formed between the optical axes of the projector and the camera and the predetermined distance between the optical axes of the projector and the camera due to some causes (for example, deterioration of products and collision), it is possible to correct the errors and to correct the distortion of a projection image. Therefore, it is possible to generate a distortion-corrected projection image with high accuracy, as compared to the first embodiment.

<<Addition>>

<Invention 1>

An automatic projection image correction system includes: a projection image frame detection unit that detects straight lines forming a frame of a screen-projected image which is projected onto a screen by a projector from a captured image obtained by capturing the screen-projected image using a camera; and a projector plane parameter estimation unit that sets coordinate axes to a projector image, which is an original image of the screen-projected image, and the captured image and estimates at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

<Invention 2>

The automatic projection image correction system according to Invention 1, the projector plane parameter estimation unit has a conversion rule for converting a point on the coordinates of the captured image into a point on the coordinates of the projector image, using the inclination of the optical axes of the projector and the camera, the distance between the optical centers of the projector and the camera, the intrinsic parameter of the camera, the distance between the screen and the projector, the inclination of the screen with respect to the optical axis of the projector, and the zoom ratio of the projector. The projector plane parameter estimation unit converts the coordinate data of the detected straight lines at the coordinates of the captured image into coordinate data at the coordinates of the projector image, using the values of the inclination of the optical axes of the projector and the camera, the distance between the optical centers of the projector and the camera, and the intrinsic parameter of the camera, which are fixed values, and the values of the distance between the screen and the projector, the inclination of the screen with respect to the optical axis of the projector, and the zoom ratio of the projector, which are indefinite value, and estimates a plurality of the indefinite values such that the converted coordinate data is approximate to the coordinate data of the straight lines corresponding to the frame at the coordinates of the projector image.

<Invention 3>

The automatic projection image correction system according to Invention 1, the projector plane parameter estimation unit has a conversion rule for converting a point on the coordinates of the projector image into a point on the coordinates of the captured image, using the inclination of the optical axes of the projector and the camera, the distance between the optical centers of the projector and the camera, the intrinsic parameter of the camera, the distance between the screen and the projector, the inclination of the screen with respect to the optical axis of the projector, and the zoom ratio of the projector. The projector plane parameter estimation unit converts the coordinate data of the straight lines corresponding to the frame at the coordinates of the projector image into coordinate data at the coordinates of the captured image, using the values of the inclination of the optical axes of the projector and the camera, the distance between the optical centers of the projector and the camera, and the intrinsic parameter of the camera, which are fixed values, and the values of the distance between the screen and the projector, the inclination of the screen with respect to the optical axis of the projector, and the zoom ratio of the projector, which are indefinite value, and estimates a plurality of the indefinite values such that the converted coordinate data is approximate to the coordinate data of the detected straight lines at the coordinates of the captured image.

<Invention 4>

The automatic projection image correction system according to any one of Inventions 1 to 3 further includes a projection pattern generation unit that sets coordinate axes of a virtual screen, using the values of the distance between the screen and the projector and the inclination of the screen with respect to the optical axis of the projector which are estimated by the projector plane parameter estimation unit, calculates projection positions of a plurality of arbitrary points on the projector image onto the virtual screen, further using the value of the zoom ratio of the projector estimated by the projector plane parameter estimation unit, and generates the projector image which is corrected such that the screen-projected image is not distorted, using the calculation result.

<Invention 5>

The automatic projection image correction system according to any one of Inventions 1 to 4, the projection image frame detection unit detects straight lines from the screen-projected image included in the captured image and detects the straight lines forming the frame of the screen-projected image from the detected straight lines.

<Invention 6>

The automatic projection image correction system according to Invention 5, the projection image frame detection unit detects the straight lines forming the frame of the screen-projected image, based on at least one of reliability of the straight lines detected from the screen-projected image, the inclination of the straight lines, and the position of the straight lines.

<Invention 7>

The automatic projection image correction system according to any one of Inventions 1 to 6 further includes a plane parameter verification unit that determines whether the values of the distance between the screen and the projector and the inclination of the screen with respect to the optical axis of the projector which are estimated by the projector plane parameter estimation unit are within a predetermined range and determines whether the values estimated by the projector plane parameter estimation unit are correct.

<Invention 8>

The automatic projection image correction system according to any one of Inventions 1 to 7 further includes an image composite unit that generates a composite image in which a frame of a predetermined color is superimposed on the projector image. The projection image frame detection unit detects the straight lines forming the frame of the screen-projected image from a captured image obtained by capturing the screen-projected image in the composite image using the camera.

<Invention 9>

The automatic projection image correction system according to any one of Inventions 1 to 8 further includes: a projection image frame storage unit that stores the position of the frame detected by the projection image frame detection unit; and a camera parameter estimation unit that sets coordinate axes to the projector image, which is the original image of the screen-projected image, and the captured image and estimates the inclination of the optical axes of the projector and the camera and the distance between the optical centers of the projector and the camera, using the intrinsic parameter of the camera and the position of the frame stored in the projection image frame storage unit.

<Invention 10>

A program that causes a computer to function as: a projection image frame detection unit that detects straight lines forming a frame of a screen-projected image which is projected onto a screen by a projector from a captured image obtained by capturing the screen-projected image using a camera; and a projector plane parameter estimation unit that sets coordinate axes to a projector image, which is an original image of the screen-projected image, and the captured image and estimates at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

<Invention 11>

The program according to Invention 10, the projector plane parameter estimation unit has a conversion rule for converting a point on the coordinates of the captured image into a point on the coordinates of the projector image, using the inclination of the optical axes of the projector and the camera, the distance between the optical centers of the projector and the camera, the intrinsic parameter of the camera, the distance between the screen and the projector, the inclination of the screen with respect to the optical axis of the projector, and the zoom ratio of the projector. The projector plane parameter estimation unit converts the coordinate data of the detected straight lines at the coordinates of the captured image into coordinate data at the coordinates of the projector image, using the values of the inclination of the optical axes of the projector and the camera, the distance between the optical centers of the projector and the camera, and the intrinsic parameter of the camera, which are fixed values, and the values of the distance between the screen and the projector, the inclination of the screen with respect to the optical axis of the projector, and the zoom ratio of the projector, which are indefinite value, and estimates a plurality of the indefinite values such that the converted coordinate data is approximate to the coordinate data of the straight lines corresponding to the frame at the coordinates of the projector image.

<Invention 12>

The program according to Invention 10, the projector plane parameter estimation unit has a conversion rule for converting a point on the coordinates of the projector image into a point on the coordinates of the captured image, using the inclination of the optical axes of the projector and the camera, the distance between the optical centers of the projector and the camera, the intrinsic parameter of the camera, the distance between the screen and the projector, the inclination of the screen with respect to the optical axis of the projector, and the zoom ratio of the projector. The projector plane parameter estimation unit converts the coordinate data of the straight lines corresponding to the frame at the coordinates of the projector image into coordinate data at the coordinates of the captured image, using the values of the inclination of the optical axes of the projector and the camera, the distance between the optical centers of the projector and the camera, and the intrinsic parameter of the camera, which are fixed values, and the values of the distance between the screen and the projector, the inclination of the screen with respect to the optical axis of the projector, and the zoom ratio of the projector, which are indefinite value, and estimates a plurality of the indefinite values such that the converted coordinate data is approximate to the coordinate data of the detected straight lines at the coordinates of the captured image.

<Invention 13>

The program according to any one of Inventions 10 to 12 further causes the computer to function as: a projection pattern generation unit that sets coordinate axes of a virtual screen, using the values of the distance between the screen and the projector and the inclination of the screen with respect to the optical axis of the projector which are estimated by the projector plane parameter estimation unit, calculates projection positions of a plurality of arbitrary points on the projector image onto the virtual screen, further using the value of the zoom ratio of the projector estimated by the projector plane parameter estimation unit, and generates the projector image which is corrected such that the screen-projected image is not distorted, using the calculation result.

<Invention 14>

The program according to any one of Inventions 10 to 13, the projection image frame detection unit detects straight lines from the screen-projected image included in the captured image and detects the straight lines forming the frame of the screen-projected image from the detected straight lines.

<Invention 15>

The program according to Invention 14, the projection image frame detection unit detects the straight lines forming the frame of the screen-projected image, based on at least one of reliability of the straight lines detected from the screen-projected image, the inclination of the straight lines, and the position of the straight lines.

<Invention 16>

The program according to any one of Inventions 10 to 15 further causes the computer to function as a plane parameter verification unit that determines whether the values of the distance between the screen and the projector and the inclination of the screen with respect to the optical axis of the projector which are estimated by the projector plane parameter estimation unit are within a predetermined range and determines whether the values estimated by the projector plane parameter estimation unit are correct.

<Invention 17>

The program according to any one of Inventions 10 to 16 further causes the computer to function as an image composite unit that generates a composite image in which a frame of a predetermined color is superimposed on the projector image. The projection image frame detection unit detects the straight lines forming the frame of the screen-projected image from a captured image obtained by capturing the screen-projected image in the composite image using the camera.

<Invention 18>

The program according to any one of Inventions 10 to 17 further causes the computer to function as: a projection image frame storage unit that stores the position of the frame detected by the projection image frame detection unit; and a camera parameter estimation unit that sets coordinate axes to the projector image, which is the original image of the screen-projected image, and the captured image and estimates the inclination of the optical axes of the projector and the camera and the distance between the optical centers of the projector and the camera, using the intrinsic parameter of the camera and the position of the frame stored in the projection image frame storage unit.

<Invention 19>

An automatic projection image correction method that causes a computer to perform: a projection image frame detection step of detecting straight lines forming a frame of a screen-projected image which is projected onto a screen by a projector from a captured image obtained by capturing the screen-projected image using a camera; and a projector plane parameter estimation step of setting coordinate axes to a projector image, which is an original image of the screen-projected image, and the captured image and estimating at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

<Invention 20>

The automatic projection image correction method according to Invention 19, the projector plane parameter estimation step uses a conversion rule for converting a point on the coordinates of the captured image into a point on the coordinates of the projector image, using the inclination of the optical axes of the projector and the camera, the distance between the optical centers of the projector and the camera, the intrinsic parameter of the camera, the distance between the screen and the projector, the inclination of the screen with respect to the optical axis of the projector, and the zoom ratio of the projector. The projector plane parameter estimation step converts the coordinate data of the detected straight lines at the coordinates of the captured image into coordinate data at the coordinates of the projector image, using the values of the inclination of the optical axes of the projector and the camera, the distance between the optical centers of the projector and the camera, and the intrinsic parameter of the camera, which are fixed values, and the values of the distance between the screen and the projector, the inclination of the screen with respect to the optical axis of the projector, and the zoom ratio of the projector, which are indefinite value, and estimates a plurality of the indefinite values such that the converted coordinate data is approximate to the coordinate data of the straight lines corresponding to the frame at the coordinates of the projector image.

<Invention 21>

The automatic projection image correction method according to Invention 19, the projector plane parameter estimation step uses a conversion rule for converting a point on the coordinates of the projector image into a point on the coordinates of the captured image, using the inclination of the optical axes of the projector and the camera, the distance between the optical centers of the projector and the camera, the intrinsic parameter of the camera, the distance between the screen and the projector, the inclination of the screen with respect to the optical axis of the projector, and the zoom ratio of the projector. The projector plane parameter estimation step converts the coordinate data of the straight lines corresponding to the frame at the coordinates of the projector image into coordinate data at the coordinates of the captured image, using the values of the inclination of the optical axes of the projector and the camera, the distance between the optical centers of the projector and the camera, and the intrinsic parameter of the camera, which are fixed values, and the values of the distance between the screen and the projector, the inclination of the screen with respect to the optical axis of the projector, and the zoom ratio of the projector, which are indefinite value, and estimates a plurality of the indefinite values such that the converted coordinate data is approximate to the coordinate data of the detected straight lines at the coordinates of the captured image.

<Invention 22>

The automatic projection image correction method according to any one of Inventions 19 to 21 further causes the computer to perform a projection pattern generation step of setting coordinate axes of a virtual screen, using the values of the distance between the screen and the projector and the inclination of the screen with respect to the optical axis of the projector which are estimated in the projector plane parameter estimation step, calculating projection positions of a plurality of arbitrary points on the projector image onto the virtual screen, further using the value of the zoom ratio of the projector estimated in the projector plane parameter estimation step, and generating the projector image which is corrected such that the screen-projected image is not distorted, using the calculation result.

<Invention 23>

The automatic projection image correction method according to any one of Inventions 19 to 22, the projection image frame detection step detects straight lines from the screen-projected image included in the captured image and detects the straight lines forming the frame of the screen-projected image from the detected straight lines.

<Invention 24>

The automatic projection image correction method according to Invention 23, the projection image frame detection step detects the straight lines forming the frame of the screen-projected image, based on at least one of reliability of the straight lines detected from the screen-projected image, the inclination of the straight lines, and the position of the straight lines.

<Invention 25>

The automatic projection image correction method according to any one of Inventions 19 to 24 further causes the computer to perform a plane parameter verification step of determining whether the values of the distance between the screen and the projector and the inclination of the screen with respect to the optical axis of the projector which are estimated by the projector plane parameter estimation step are within a predetermined range and determining whether the values estimated in the projector plane parameter estimation step are correct.

<Invention 26>

The automatic projection image correction method according to any one of Inventions 19 to 25 further causes the computer to perform an image composite step of generating a composite image in which a frame of a predetermined color is superimposed on the projector image. The projection image frame detection step detects the straight lines forming the frame of the screen-projected image from a captured image obtained by capturing the screen-projected image in the composite image using the camera.

<Invention 27>

The automatic projection image correction method according to any one of Inventions 19 to 26 further causes the computer to perform: a projection image frame storage step of storing the position of the frame detected in the projection image frame detection step; and a camera parameter estimation step of setting coordinate axes to the projector image, which is the original image of the screen-projected image, and the captured image and estimating the inclination of the optical axes of the projector and the camera and the distance between the optical centers of the projector and the camera, using the intrinsic parameter of the camera and the position of the frame stored in the projection image frame storage step.

Priority is claimed on Japanese Patent Application No. 2011-201789, filed on Sep. 15, 2011, the content of which is incorporated herein by reference.

The invention claimed is:

1. An automatic projection image correction system comprising:
    a projection image frame detection unit that detects straight lines forming a frame of a screen-projected image which is projected onto a screen by a projector from a captured image obtained by capturing the screen-projected image using a camera; and
    a projector plane parameter estimation unit that sets coordinate axes to a projector image, which is an original image of the screen-projected image, and the captured image and estimates at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

2. The automatic projection image correction system according to claim 1,
    wherein the projector plane parameter estimation unit has a conversion rule for converting a point on the coordinates of the captured image into a point on the coordinates of the projector image, using the inclination of the optical axes of the projector and the camera, the distance between the optical centers of the projector and the camera, the intrinsic parameter of the camera, the distance between the screen and the projector, the inclination of the screen with respect to the optical axis of the projector, and the zoom ratio of the projector, and
    the projector plane parameter estimation unit converts the coordinate data of the detected straight lines at the coordinates of the captured image into coordinate data at the coordinates of the projector image, using the values of the inclination of the optical axes of the projector and the camera, the distance between the optical centers of the projector and the camera, and the intrinsic parameter of the camera, which are fixed values, and the values of the distance between the screen and the projector, the inclination of the screen with respect to the optical axis of the projector, and the zoom ratio of the projector, which are variable value, and estimates a plurality of the variable values such that the converted coordinate data is approximate to the coordinate data of the straight lines corresponding to the frame at the coordinates of the projector image.

3. The automatic projection image correction system according to claim 1,
    wherein the projector plane parameter estimation unit has a conversion rule for converting a point on the coordinates of the projector image into a point on the coordinates of the captured image, using the inclination of the optical axes of the projector and the camera, the distance between the optical centers of the projector and the camera, the intrinsic parameter of the camera, the distance between the screen and the projector, the inclination of the screen with respect to the optical axis of the projector, and the zoom ratio of the projector, and
    the projector plane parameter estimation unit converts the coordinate data of the straight lines corresponding to the frame at the coordinates of the projector image into coordinate data at the coordinates of the captured image, using the values of the inclination of the optical axes of the projector and the camera, the distance between the optical centers of the projector and the camera, and the intrinsic parameter of the camera, which are fixed values, and the values of the distance between the screen and the projector, the inclination of the screen with respect to the optical axis of the projector, and the zoom ratio of the projector, which are variable value, and estimates a plurality of the variable values such that the converted coordinate data is approximate to the coordinate data of the detected straight lines at the coordinates of the captured image.

4. The automatic projection image correction system according to claim 1, further comprising:
    a projection pattern generation unit that sets coordinate axes of a virtual screen, using the values of the distance between the screen and the projector and the inclination of the screen with respect to the optical axis of the projector which are estimated by the projector plane parameter estimation unit, calculates projection positions of a plurality of arbitrary points on the projector image onto the virtual screen, further using the value of the zoom ratio of the projector estimated by the projector plane parameter estimation unit, and generates the projector image which is corrected such that the screen-projected image is not distorted, using the calculation result.

5. The automatic projection image correction system according to claim 1,
    wherein the projection image frame detection unit detects straight lines from the screen-projected image included in the captured image and detects the straight lines forming the frame of the screen-projected image from the detected straight lines.

6. The automatic projection image correction system according to according to claim 5,
    wherein the projection image frame detection unit detects the straight lines forming the frame of the screen-projected image, based on at least one of reliability of the straight lines detected from the screen-projected image, the inclination of the straight lines, and the position of the straight lines.

7. The automatic projection image correction system according to claim 1, further comprising:
an image composite unit that generates a composite image in which a frame of a predetermined color is superimposed on the projector image,
wherein the projection image frame detection unit detects the straight lines forming the frame of the screen-projected image from a captured image obtained by capturing the screen-projected image in the composite image using the camera.

8. The automatic projection image correction system according to claim 1, further comprising:
a projection image frame storage unit that stores the position of the frame detected by the projection image frame detection unit; and
a camera parameter estimation unit that sets coordinate axes to the projector image, which is the original image of the screen-projected image, and the captured image and estimates the inclination of the optical axes of the projector and the camera and the distance between the optical centers of the projector and the camera, using the intrinsic parameter of the camera and the position of the frame stored in the projection image frame storage unit.

9. A non-transitory storage medium storing a program that causes a computer to function as:
a projection image frame detection unit that detects straight lines forming a frame of a screen-projected image which is projected onto a screen by a projector from a captured image obtained by capturing the screen-projected image using a camera; and
a projector plane parameter estimation unit that sets coordinate axes to a projector image, which is an original image of the screen-projected image, and the captured image and estimates at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

10. An automatic projection image correction method that causes a computer to perform:
a projection image frame detection step of detecting straight lines forming a frame of a screen-projected image which is projected onto a screen by a projector from a captured image obtained by capturing the screen-projected image using a camera; and
a projector plane parameter estimation step of setting coordinate axes to a projector image, which is an original image of the screen-projected image, and the captured image and estimating at least one of a distance between the screen and the projector, an inclination of the screen with reference to an optical axis of the projector, and a zoom ratio of the projector, using an inclination of the optical axes of the projector and the camera, a distance between the optical centers of the projector and the camera, an intrinsic parameter of the camera, coordinate data of the detected straight lines at coordinates of the captured image, and coordinate data of straight lines corresponding to the frame at coordinates of the projector image.

* * * * *